(12) United States Patent
Neeter

(10) Patent No.: US 10,339,715 B2
(45) Date of Patent: Jul. 2, 2019

(54) VIRTUAL REALITY SYSTEM

(71) Applicant: Factual VR, Inc., Jersey City, NJ (US)

(72) Inventor: Eduardo Neeter, Jersey City, NJ (US)

(73) Assignee: FACTUALVR, INC., Jersey City, NJ (US)

( * ) Notice: Subject to any disclaimer, the term of this patent is extended or adjusted under 35 U.S.C. 154(b) by 0 days.

(21) Appl. No.: 15/693,400

(22) Filed: Aug. 31, 2017

(65) Prior Publication Data

US 2018/0061138 A1  Mar. 1, 2018

Related U.S. Application Data

(60) Provisional application No. 62/382,131, filed on Aug. 31, 2016.

(51) Int. Cl.
*G06T 17/00* (2006.01)
*G06T 19/00* (2011.01)
*G06K 9/00* (2006.01)
*H04S 7/00* (2006.01)

(52) U.S. Cl.
CPC ........ *G06T 19/006* (2013.01); *G06K 9/00671* (2013.01); *G06T 19/00* (2013.01); *H04S 7/303* (2013.01); *G06K 9/00677* (2013.01); *H04S 7/304* (2013.01); *H04S 2400/11* (2013.01)

(58) Field of Classification Search
CPC .......................... G06T 2219/024; G06T 17/00
USPC .......................................................... 345/633
See application file for complete search history.

(56) References Cited

U.S. PATENT DOCUMENTS

2016/0026253 A1* 1/2016 Bradski ................ G02B 27/225
                                                                                  345/8
2017/0316608 A1* 11/2017 Khalid .................... H04L 67/38

* cited by examiner

*Primary Examiner* — Thomas J Lett

(57) ABSTRACT

Operations carried out according to a method and operations carried out by a system including at least one processor and memory configured to store instructions include following operations. Those operations include: obtaining real world image data using one or more image data capturing devices positioned at a real world site; obtaining real world non-image data using one or more sensors positioned at the real world site; creating a scene model based on the obtained real world image data; integrating the obtained real world non-image data with the created scene model; carrying out an object recognition process to identify one or more objects included in the scene model; and rendering the scene model to create a VR scene in which one or more users are immersed using one or more VR playback devices.

20 Claims, 8 Drawing Sheets

VIRTUAL REALITY SYSTEM

CROSS-REFERENCE TO RELATED APPLICATIONS

This application claims priority to U.S. Provisional Patent Application No. 62/382,131, filed Aug. 31, 2016, which is incorporated herein by reference.

BACKGROUND

Virtual reality (VR) technology is becoming more prevalent in various fields. Using a VR playing device, such as a head mount display (HMD), an audience member can be immersed in a VR scene that is created based on a real world site and/or a group of artificially-created objects and have an experience as if the audience member were physically in the VR scene. As the use of the VR technology expands into various fields, more variety of functionalities within the VR scene will be in demand, so that audience members can achieve intended purposes through the VR scene.

The foregoing examples of the related art and limitations related therewith are intended to be illustrative and not exclusive. Other limitations of the related art will become apparent to those of skill in the art upon a reading of the specification and a study of the drawings.

DETAILED DESCRIPTION

Figure 1:
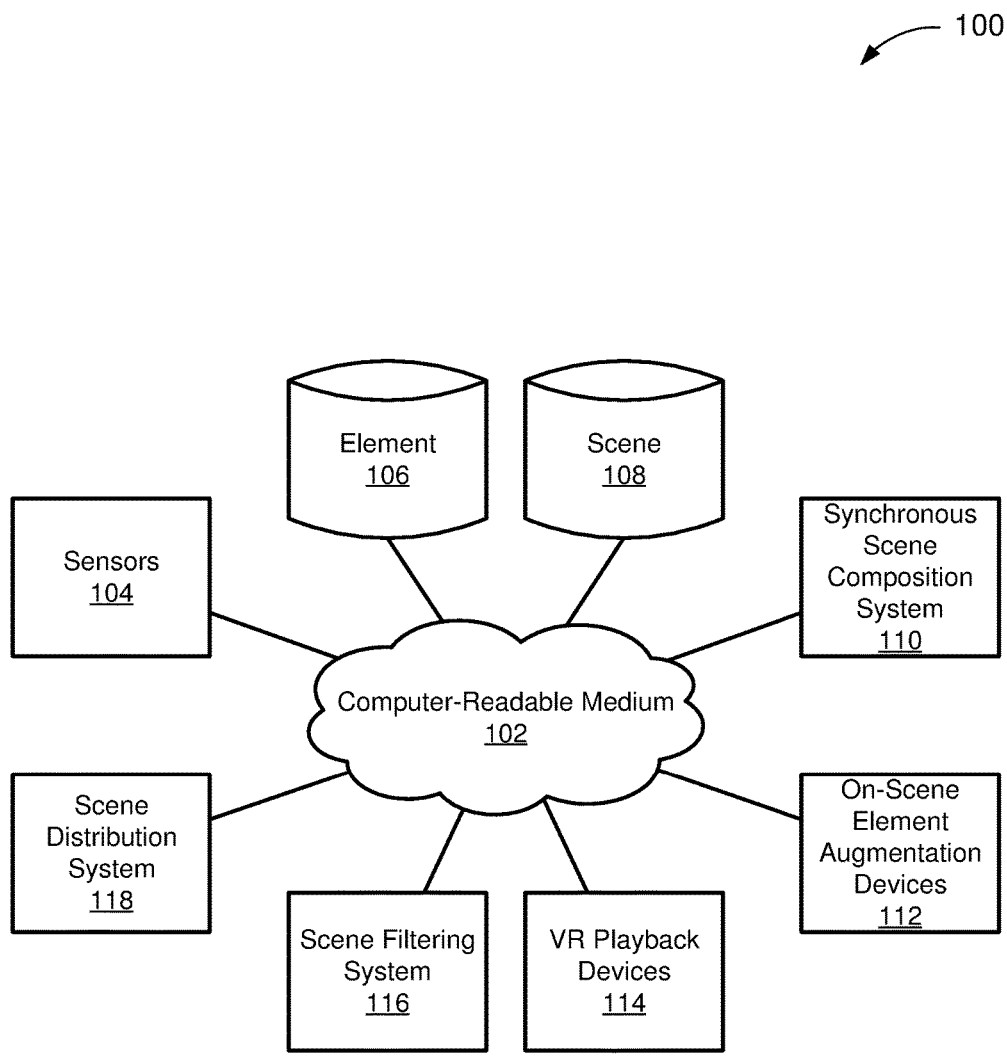
FIG. 1 depicts a diagram of an example of a synchronous scene building system.

FIG. 1 depicts a diagram 100 of an example of a synchronous scene building system. The diagram 100 includes a computer-readable medium (CRM) 102, one or more sensors 104 coupled to the CRM 102, an element datastore 106 coupled to the CRM 102, a scene datastore 108 coupled to the CRM 102, a synchronous scene composition system 110 coupled to the CRM 102, one or more on-scene element augmentation devices 112 coupled to the CRM 102, one or more VR playback devices 114 coupled to the CRM 102, a scene filtering system 116 coupled to the CRM 102, and a scene distribution system 118 coupled to the CRM 102.

The CRM 102 and other CRMs discussed in this paper are intended to include all mediums that are statutory (e.g., in the United States, under 35 U.S.C. 101), and to specifically exclude all mediums that are non-statutory in nature to the extent that the exclusion is necessary for a claim that includes the CRM to be valid. Known statutory CRMs include hardware (e.g., registers, random access memory (RAM), non-volatile (NV) storage, to name a few), but may or may not be limited to hardware.

The CRM 102 and other computer readable mediums discussed in this paper are intended to represent a variety of potentially applicable technologies. For example, the CRM 102 can be used to form a network or part of a network. Where two components are co-located on a device, the CRM 102 can include a bus or other data conduit or plane. Depending upon implementation-specific or other considerations, the CRM 102 can include wired communication interfaces and wireless communication interfaces for communicating over wired or wireless communication channels. Where a first component is located on a first device and a second component is located on a second (different) device, the CRM 102 can include a wireless or wired back-end network or LAN. The CRM 102 can also encompass a relevant portion of a WAN or other network, if applicable. Enterprise networks can include geographically distributed LANs coupled across WAN segments. For example, a distributed enterprise network can include multiple LANs (each LAN is sometimes referred to as a Basic Service Set (BSS) in IEEE 802.11 parlance, though no explicit requirement is suggested here) separated by WAN segments. An enterprise network can also use VLAN tunneling (the connected LANs are sometimes referred to as an Extended Service Set (ESS) in IEEE 802.11 parlance, though no explicit requirement is suggested here). Depending upon implementation or other considerations, the CRM 102 can include a private cloud under the control of an enterprise or third party, or a public cloud.

The devices, systems, and CRMs described in this paper can be implemented as a computer system or parts of a computer system or a plurality of computer systems. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. The bus can also couple the processor to non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. Depending upon implementation-specific or other considerations, the I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, ISDN modem, cable modem, token ring interface, satellite transmission interface (e.g. "direct PC"), or other interfaces for coupling a computer system to other computer systems. Interfaces enable computer systems and other devices to be coupled together in a network.

The computer systems can be compatible with or implemented as part of or through a cloud-based computing system. As used in this paper, a cloud-based computing system is a system that provides virtualized computing resources, software and/or information to end user devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their end user device.

A computer system can be implemented as an engine, as part of an engine or through multiple engines. As used in this paper, an engine includes one or more processors or a portion thereof. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors or a first engine and a second engine can share one or more processors with one another or other engines. Depending upon implementation-specific or other considerations, an engine can be centralized or its functionality distributed. An engine can include hardware, firmware, or software embodied in a CRM for execution by the processor. The processor transforms data into new data using implemented data structures and methods, such as is described with reference to the figures in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical CRM on a specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud-based datastore is a datastore that is compatible with cloud-based computing systems and engines.

Returning to the example of FIG. 1, the sensors 104 illustrated in diagram 100 are intended to represent devices having functions to obtain real world parameters, such as visual data including images (2D still images, 2D video images, 3D still images, 3D video images, etc.), audio data, osmic data, or haptic data. Examples of the sensors 104 are 3D scanners, 2D and/or 3D cameras for still images (including 180 degree cameras and 360 degree cameras), 2D and/or 3D video cameras (including 180 degree cameras and 360 degree cameras), microphones, temperature sensors, speed meters, gyro sensors, accelerometers, GPS sensors, infrared imagers, smoke detectors, any detectors to detect chemical materials, etc. to name several. In a specific implementation, the sensors 104 capture first data (e.g., audio data) and second data (e.g., image data) to enable the creation of a scene with sensed data positioned within a virtual space time in a manner that mimics the location of the sensed stimuli in the real world. The first data and the second data can be captured asynchronously (at different times) and synchronized later by matching events, timestamps, or other point-in-time occurrences in each individual input data set, or the first data and the second data could be captured at the same time, making the first and second data at least temporally synchronized.

In a specific implementation, the sensors 104 include wired or wireless interfaces through which the sensors 104 send obtained data over the CRM 102. The function of wired or wireless communication may be implemented by a separate device from the sensors 104. In a specific implementation, the sensors 104 may include internal data storage in which the obtained data can be stored at least temporarily or for the purpose of backup. The internal data storage may support multiple file formats. In a specific implementation, the sensors 104 may include an actuator to change orientations of sensing portions (e.g., lens, microphones, etc.) of the sensors 104. For example, the actuator can include a motor to rotate the sensing portions of the sensors 104. In a specific implementation, the sensors 104 may include a locomotive mechanism to change positions of the sensing portions of the sensors 104. For example, the locomotive mechanism includes one or more wheels to be placed on the ground, a driving mechanism to rotate the wheels, and a stand (e.g., tripods) to which a sensing portion of the sensors 104 is attached. In a specific implementation, each image data obtained by the sensors 104 is timestamped so as to be associated with real world time. The timestamp can be used as a hint to help synchronization and placement of associated elements, but, in a specific implementation, the timestamp is not the exclusive arbiter of time and may not even necessarily be considered sufficient to an acceptable degree of certainty. For example, to treat timestamps as exclusive and sufficient arbiters, each sensor might need to be synchronized before capturing stimuli, but that is not possible in some implementations.

In a specific implementation, the sensors 104 are activated and/or deactivated at different times. For example, some of the sensors 104 may be active from prior to an agent arriving on-scene, such as security cameras, and continue activation afterward, while others of the sensors 104 might arrive with a particular actor, while yet others of the sensors 104 may be sporadic or random, such as pictures taken by unrelated bystanders or witnesses. For example, an operator of the sensors 104 may manually set up and activate one of the sensors 104 at a real world site, to start obtaining real world image data, and may manually deactivate the one of the sensors 104 to cease obtaining the real world image data with that sensor. In such a situation, for example, an element (say, a getaway car) can be captured in security camera footage prior to arrival on the scene, a witness can record the getaway car speeding away, a neighbor can state they heard a car taking off at high speed at a particular time, an on-scene agent can take pictures of tire tracks, and an off-site agent can match the license plate of the getaway car to a known make and model (and owner). Each of these various elements can then be combined to define the getaway car element (and perhaps augmented with a virtual car animation that matches known attributes derived from or corroborated with sensed data at space-time locations that were not actually sensed).

In this paper, a scene (or VR scene) is intended to be a virtual volume over a continuous or discontinuous period of time and VR objects in the virtual volume. It should be noted a scene (or VR scene) may be characterized as what amounts to a field of view (FOV) in contexts outside of this paper, but in this paper, a scene is not a FOV and a FOV is explicitly referred to as such. Accordingly, as used in this paper, a scene (or VR scene) assumes unique (within the context of the scene) virtual space-time and VR objects within the virtual space-time.

In a specific implementation, the sensors 104 include unique identifiers that can be used when transmitting data through a network. Unique identifiers can include identifiers created in accordance with Internet Protocol version 4 (hereinafter referred to as "IPv4"), or identifiers created in accordance with Internet Protocol version 6 (hereinafter referred to as "IPv6"), of which both protocol versions are hereby incorporated by reference. Depending upon implementation-specific or other considerations, the sensors 104 can include applicable communication interfaces for receiving and sending data according to an applicable wireless device protocol. Examples of applicable wireless device protocols include Wi-Fi, ZigBee®, Bluetooth®, and other applicable low-power communication standards. Depending upon implementation-specific or other considerations, the data transmission is carried out with secured and encrypted connection from the sensors 104.

In a specific implementation, the sensors 104 act as stations. A station, as used in this paper, can be referred to as a device with a media access control (MAC) address and a physical layer (PHY) interface to a wireless medium that complies with the IEEE 802.11 standard. Thus, for example, the network devices can be referred to as stations, if applicable. IEEE 802.11a-1999, IEEE 802.11b-1999, IEEE 802.11g-2003, IEEE 802.11-2007, and IEEE 802.11n TGn Draft 8.0 (2009) are incorporated by reference. As used in this paper, a system that is 802.11 standards-compatible or 802.11 standards-compliant complies with at least some of one or more of the incorporated documents' requirements and/or recommendations, or requirements and/or recommendations from earlier drafts of the documents, and includes Wi-Fi systems. Wi-Fi is a non-technical description that is generally correlated with the IEEE 802.11 standards, as well as Wi-Fi Protected Access (WPA) and WPA2 security standards, and the Extensible Authentication Protocol (EAP) standard. In alternative embodiments, a station may comply with a different standard than Wi-Fi or IEEE 802.11, may be referred to as something other than a "station," and may have different interfaces to a wireless or other medium.

In a specific implementation, the sensors 104 are configured to access network services in compliance with IEEE 802.3. IEEE 802.3 is a working group and a collection of IEEE standards produced by the working group defining the physical layer and data link layer's MAC of wired Ethernet. This is generally a local area network technology with some wide area network applications. Physical connections are typically made between nodes and/or infrastructure devices (hubs, switches, routers) by various types of copper or fiber cable. IEEE 802.3 is a technology that supports the IEEE 802.1 network architecture. As is well-known in the relevant art, IEEE 802.11 is a working group and collection of standards for implementing wireless local area network (WLAN) computer communication in the 2.4, 3.6 and 5 GHz frequency bands. The base version of the standard IEEE 802.11-2007 has had subsequent amendments. These standards provide the basis for wireless network products using the Wi-Fi brand. IEEE 802.1 and 802.3 are incorporated by reference.

The element datastore 106 illustrated in diagram 100 is intended to represent element data for the generating of a scene model. The element data includes data obtained by the sensors 104 and any available data accessible through a public or private network. Elements can include both objects and actions, and depending upon implementation-specific factors, an element can include an object and action component, or elements can be of either an object or an action data structure type. Additional detail regarding the element datastore 106 is provided below.

The scene datastore 108 illustrated in diagram 100 is intended to represent a store of generated scene models. In a specific implementation, the scene datastore 108 is accessed by the VR playback devices 114 for real time streaming or playback on the devices. Additional detail regarding the scene datastore 108 is provided later.

The synchronous scene composition system 110 illustrated in diagram 100 is intended to represent a system that augments elements in the element datastore 106 and composes a scene for storage in the scene datastore 108. In a specific implementation, the scene composition system includes devices with functions of managing (e.g., generating and editing) scene models, which are 3D frame representations of elements (objects and actions associated therewith) corresponding to objects at a real world site. Scenes can be built from any sensor data, however sparse, and augmented over time as additional sensor data is received, analyzed, and/or augmented using other sources of data. In a specific implementation, human and/or artificial agents augment elements in real-time as a scene is played back synchronously with the augmentation thereof. A synchronous AR presentation is also possible in lieu of or in addition to synchronous scene playback. A human agent making use of the synchronous scene composition system 110 to augment elements or a scene need not be tied to a single device and can make use of different devices at different times (e.g., a desktop at home, a laptop at work, a smartphone on the train, different workstations, etc.). An asynchronous scene composition system (not shown) can be characterized as a separate system, and such a system has been implemented in prototype. Asynchronous scene composition can include techniques such as placing sensors within scenes enabling the determination of sensor point of origin, integrate data from other sources recovered at later times, or other techniques described later. These techniques can even be applied in systems that do not include synchronous scene composition.

The on-scene element augmentation devices 112 illustrated in diagram 100 are intended to represent devices that are wearable or at least portable, and that can be used at a real world location that corresponds to a virtual location within a scene, to augment elements associated with the scene. As used in this paper, "on-scene" is intended to indicate physical presence at a real world location that is being captured for VR presentation. As used in this paper, "element augmentation" is intended to represent providing additional sensed perspectives and/or metadata (e.g., lab results, product brochures, annotations, etc.) applicable to an element that is to be augmented. Synchronous presentation, by definition, requires on-scene augmentation of elements for use in a scene, though the synchronous presentation could conceivably be on-scene, such as when multiple on-scene element augmentation devices 112 work collaboratively. Thus, annotations made by a first agent in the (virtual) scene at a first location can be perceived at the same virtual location, or a corresponding real world location via AR, by a second agent that is on-scene.

In a specific implementation, the on-scene element augmentation devices 112 include wired or wireless interfaces through which the on-scene element augmentation devices 112 can send and receive data over the CRM 102. Examples of the on-scene element augmentation devices 112 are laptop computers, tablet computers, wireless devices (such as cellular phones, smartphones, or the like), or wearable devices (such as head mount displays, goggles, glasses, or the like), to name several. In a specific implementation, on-scene element augmentation devices 112 will work in coordination with at least some of the sensors 104. For example, a sensor of the sensors 104 can be incorporated into an on-scene element augmentation device of the on-screen element augmentation devices 112.

In a specific implementation, the on-scene element augmentation devices 112 include unique identifiers which can be used in the transmission of data through a network. Depending upon implementation-specific or other considerations, the data transmission is carried out with secured and encrypted connection by the on-scene element augmentation devices 112. In a specific implementation, the on-scene element augmentation devices 112 act as stations. In a specific implementation, the on-scene element augmentation devices 112 are configured to access network services in compliance with IEEE 802.3.

The VR playback devices 114 illustrated in diagram 100 are intended to represent devices capable of playing back a scene from the scene datastore 108 in whatever state is currently available and authorized. In a specific implementation, the VR playback devices 114 include wired or wireless interfaces through which the VR playback devices 114 can send and receive data over the CRM 102. Examples of the VR playback devices 114 are desktop computers, laptop computers, tablet computers, wireless devices (such as cellular phones, smartphones, or the like), wearable devices (such as head mount displays, goggles, glasses, or the like), cave automatic virtual environments (better known by the recursive acronym CAVE), or domes, to name several. The VR playback devices 114 can include a browser and a headset, but techniques for transforming a smartphone into a 3D viewer are known (e.g., using Google Cardboard), which enables a person to experience VR scenes with a single assembled device. In a specific implementation, the VR playback devices 114 may have a function of further displaying augmented reality (AR) objects or AR scenes overlaid on a physical scene perceivable by agents in a real world. For example, a first of the VR playback devices 114 may enable an agent or audience member to be immersed in a VR scene while a second of the VR playback devices 114 may enable an agent to use AR to augment a real world scene with elements, and the VR scene and AR scene may be played concurrently such that the agent and audience member (or agent) can interact with each other. Thus, the on-scene element augmentation devices 112 can include VR playback devices 114.

In a specific implementation, scenes can be rendered for a display that does not have a VR scene displaying function, such as a flat laptop screen, which may be useful for debugging, including audience members who lack optimal tools in a presentation, or other purposes; the full impact of the VR experience currently requires some type of head (and/or eye) tracking mechanism, though neural interfaces could conceivably replace physical head (and/or eye) movement tracking. A multimedia experience entails the use of both video and audio, so the VR playback devices 114 may also be equipped with headphones, earbuds, speakers, or other device for providing audio to a VR scene audience member. In a specific implementation, at least one of the VR playback devices 114 has an application installed for enabling a VR mode.

In a specific implementation, the VR playback devices 114 include unique identifiers which can be used in the transmission of data through a network. Depending upon implementation-specific or other considerations, the data transmission is carried out with secured and encrypted connection by the VR playback devices 114. In a specific implementation, the VR playback devices 114 act as stations. In a specific implementation, the VR playback devices 114 are configured to access network services in compliance with IEEE 802.3.

The scene filtering system 116 illustrated in diagram 100 is intended to represent a platform that facilitates management of scenes to limit information to that which is desired or allowed for audience members. Filters can limit information to a particular subset of information (e.g., undisputed information, information a jury is not entitled to see, or information that is associated with a particular actor within a scene, to name a few).

The scene distribution system 118 illustrated in diagram 100 is intended to represent a platform that facilitates the distribution of scenes from the scene datastore 108 for playback. Scenes can be, e.g., streamed from a server, downloaded to playback devices, or distributed in some other applicable manner. The scenes can be pre-filtered prior to distribution to devices without full authorization or display capabilities, or the filters can be implemented at the devices (and may or may not be configurable).

In an example of operation, a system such as is illustrated in FIG. 1 operates as follows. The sensors 104 provide real world data to the element datastore 106. One or more human or artificial agents use the synchronous scene composition system 110 to place elements from the element datastore 106 within a scene model for storage in the scene datastore 108. Creation of a scene model can entail integrating and synchronizing data obtained from the sensors 104, obtaining supplementary data from the sensors 104, integrating metadata from sources other than the sensors 104, and augmenting elements in the element datastore 106 with supplementary data or metadata. The on-scene element augmentation devices 112 provide real-time data to human agents at a real world location associated with at least a portion of a scene. On-scene agents (including sensors 104 or agents using on-scene element augmentation devices 112) can be instructed or requested to provide supplementary data to an off-site location (e.g., dispatch) or to collaborate with one another, and the supplementary data can be used to augment elements in the element datastore 106. The VR playback devices 114 enable playback of a scene in whatever state of development the scene is in. The VR playback devices 114 can be on-scene (synchronous), enabling, e.g., comparison of VR with real world; off-site (synchronous), facilitating, e.g., providing real-time updates for or requests from human agents who are on-scene; and off-site (asynchronous), enabling, e.g., playback of a completed scene presentation. Additional tools, not shown in diagram 100, can include tools that enable a human to more readily manage scene models, create new elements (making components of a VR playback device act as components of the synchronous scene composition system 110 or an asynchronous scene composition system); for example, an audience member could annotate a scene, creating a new element and which, depending upon implementation- and/or configuration-specific factors, may be incorporated into the scene. The scene filtering system 116 enables playback of requested or authorized portions of a scene at the VR playback devices 114, by streaming the filtered scene to relevant ones of the VR playback devices 114, editing a scene with appropriate filters for provisioning to relevant ones of the VR playback devices 114 via the scene distribution system 118. The scene distribution system 118 can enforce filtering rules via an authorization system.

Figure 2:
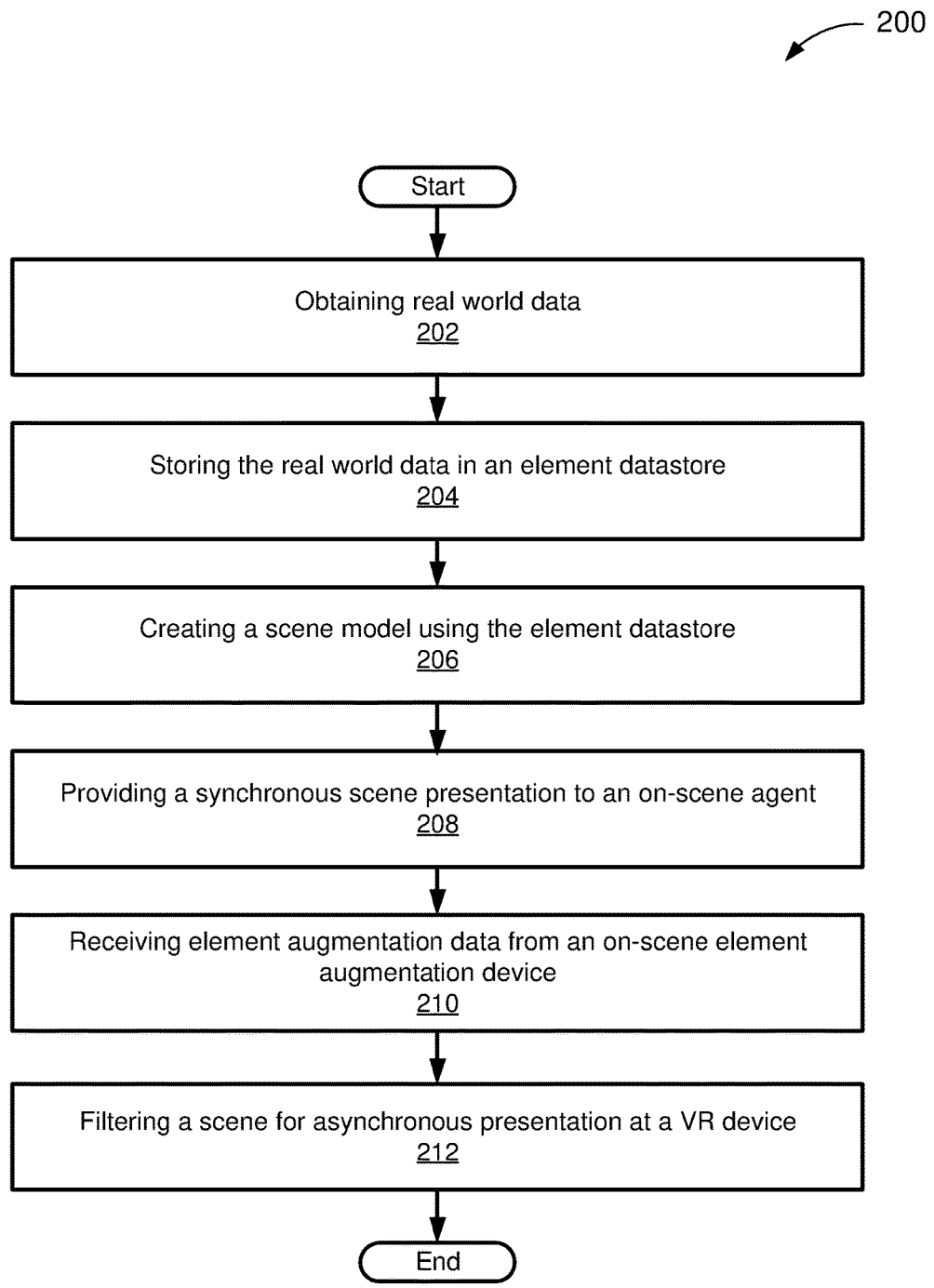
FIG. 2 depicts a flowchart of an example of a method for synchronous scene building.

FIG. 2 depicts a flowchart 200 of an example of a method for synchronous scene building. This flowchart and other flowcharts described in this paper illustrate modules (and potentially decision points) organized in a fashion that is conducive to understanding. It should be recognized, however, that the modules can be reorganized for parallel execution, reordered, modified (changed, removed, or augmented), where circumstances permit.

In the example of FIG. 2, the flowchart 200 starts at module 202, with obtaining real world data. Real world data can be captured with sensors at real world locations (e.g., 3D data captured by sensors).

In the example of FIG. 2, the flowchart 200 continues to module 204 with storing the real world data in an element datastore. In a specific implementation, data obtained by sensors is stored as an element in the element datastore. Alternatively, sensor data can also be treated as a separate datastore and only included as a component of an element data structure when the sensor data can be correlated with a real world object (or component of an object) and stored as part of the element that is correlated with the real world object. Other data can also be stored in what is at least conceptually a separate datastore from the element datastore and included as a component of an element data structure when the elements are augmented to include metadata.

In the example of FIG. 2, the flowchart 200 continues to module 206 with creating a scene model using the element datastore. In a specific implementation, a scene model is a 3D frame representation of one or more real world sites with virtual objects correlated with real world objects at corresponding locations of the scene. Advantageously, the virtual objects are elements that include metadata that can also be accessed by an AR or VR audience member. The scene model can be characterized as a framework for organizing elements in space and time. Elements can include objects corresponding to a real-world objects or creatures (and actions and metadata associated therewith); for example an element can be a car captured in a traffic camera image. Elements can also include synthetic objects, such as objects created for demonstrative purposes, that have no corresponding real-world object; for example, an arrow could be used to draw audience member attention to a car captured in a traffic camera image. Elements can include partially synthetic objects; for example, a traffic camera image may only show the front of a car and the unsensed back of the car can be generated synthetically and used to create a full 3D model of the car. (Depending upon implementation- and/or configuration-specific factors, filters can be used to filter out the synthetic portion.) It may be noted a full framework is sometimes unnecessary for AR presentation, making this module optional in some implementations.

In the example of FIG. 2, the flowchart 200 continues to module 208 with providing a synchronous scene presentation to an on-scene agent. In a specific implementation, element metadata can be provided to an on-scene agent and presented in an augmented reality (AR) environment at the real world location. Alternatively, a scene can be provided to an on-scene agent as a VR presentation at the real-world location of the on-scene agent, which may be desirable to facilitate comparisons between what is captured in the VR scene and what is extant at the real world scene.

In the example of FIG. 2, the flowchart 200 continues to module 210 with receiving element augmentation data from an on-scene element augmentation device. An on-scene agent can collect supplemental data about real world objects stored as elements in the element datastore, aided by a synchronous AR or VR presentation, responsive to instructions or advice from an off-site agent, pursuant to relevant protocols, or in accordance with the on-scene agent's preferences. Advantageously, an on-scene agent is ideally situated to compare a scene (or elements associated therewith) to a real-world location during synchronous presentation. In this paper, the collaboration between on-scene agents and off-site agents where elements or scenes are presented, in whole or in part, to both the on-scene and off-site agents is referred to as synchronous presentation.

In the example of FIG. 2, the flowchart 200 ends at module 212 with filtering a scene for asynchronous presentation at a VR device. In a specific implementation, an audience member uses a VR playback device to be immersed in a scene presented in VR, navigate the VR scene, manipulate VR objects in the VR scene, and control (manage) the VR scene. The scene can be filtered as appropriate for a given situation. For example, a jury may be prohibited from observing certain objects or actions pursuant to a judge's ruling. In another example, an audience member may request elements to be displayed that were extant at a particular time (e.g., "show me the furniture as it was arranged at 3 P.M.").

Figure 3:
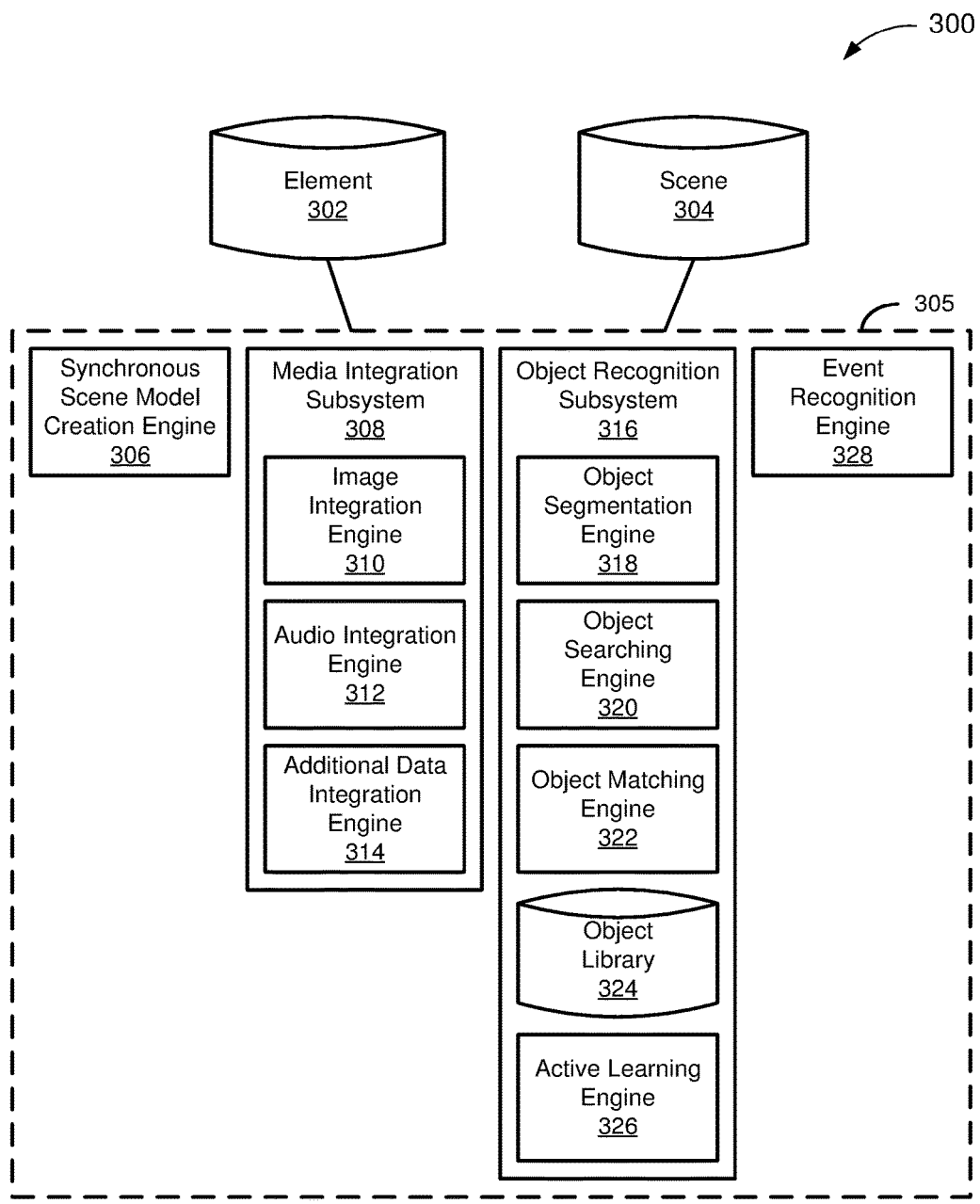
FIG. 3 depicts a diagram of an example of a synchronous scene composition system.

FIG. 3 depicts a diagram 300 of an example of a synchronous scene composition system. The diagram 300 includes an element datastore 302, a scene datastore 304, and a synchronous scene composition system 305 coupled to the element datastore 302 and the scene datastore 304. The synchronous scene composition system 305 includes a scene model creation engine 306, a media integration subsystem 308, which includes an image integration engine 310, an audio integration engine 312, and an additional data integration engine 314, an object recognition subsystem 316, which includes an object segmentation engine 318, an object searching engine 320, an object matching engine 322, and an object library 324, and an active learning engine 326, and an event recognition engine 328.

In the example of FIG. 3, the element datastore 302 is intended to represent element data structures used in the creation of scene models or for AR. In an implementation, element data are generated from sensor data and augmented with supplementary sensor data or with data from other sources. In a specific implementation, synthetic elements can be created by agents and/or audience members.

In the example of FIG. 3, the scene datastore 304 is intended to represent scene data structures that act as a framework onto which element data structures can be located in space and time.

In the example of FIG. 3, the scene model creation engine 306 is intended to represent specifically-purposed hardware and software that creates a scene model using real world image data obtained from one or more sensors. In a specific implementation, when a point cloud model or a mesh model representing a part or the entire real world scene are obtained from a sensor (e.g., 3D scanner), the scene model creation engine 306 places data of the point cloud model or mesh model in a VR environment so as to match the scale of the VR environment. In a specific implementation the scene model creation engine 306 can derive a point cloud model from a mesh model (e.g., when the point cloud model is not obtained from a sensor that generates point cloud data, such as a 3D scanner). Alternatively or in addition, the scene model creation engine can derive a mesh model from a point cloud model. In a specific implementation, the scene model creation engine 306 can derive a point cloud or mesh model from raw data if the point cloud or mesh model is not provided from the sensors. For example, when one more 2D or 3D image data are obtained from one or more sensors (e.g., 2D and/or 3D cameras), the scene model creation engine 306 can apply photogrammetry on the obtained image data and generate frame image data. In a specific implementation, the scene model creation engine 306 uses external inputs such as GPS mapping data that are obtained from GPS sensors and wide geographic mapping data that are publicly available (e.g., Google Maps), and manual agent inputs, to associate the scene model to a geographic location. More particularly, the scene model creation engine 306 associates the entire scene model with a master geographic area, which may or may not be a continuous area, and each object within the scene model with geographic coordinates. It may be noted the "area" can represent a space-time volume and coordinates can represent a location in space-time.

In the example of FIG. 3, the media integration subsystem 308 is intended to represent specifically-purposed hardware and software that integrates real world data obtained from one or more sensors into a scene model created by the scene model creation engine 306. For example, the image integration engine 310 of the media integration subsystem 308 can integrate real world image data obtained from one or more sensors into a scene model at space-time coordinates corresponding to real-world coordinates for a real-world object captured in the image, or near such coordinates. In a specific implementation, when a 2D/3D image (e.g., picture and video) is obtained from a sensor (e.g., a still camera and a video camera), the image integration engine 310 calculates a relative point of capture (POC), i.e., a position and orientation at which the 2D/3D image was captured, and a field of view (FOV), i.e., a size of the 2D/3D imaging range in the real world that was captured. Depending upon implementation- and/or configuration-specific parameters, the 2D/3D image can include 180 degree images or 360 degree images captured using specialized lenses to obtain 180 degree images and 360 degree images. In a specific implementation, the image integration engine 310 places the 2D/3D images obtained by the sensors in association with the calculated POC in the scene model at virtual space-time coordinates corresponding to space and time in the real world.

The audio integration engine 312 of the media integration subsystem 308 integrates real world audio data obtained from one or more sensors into to the scene model. For example, the audio integration engine 312 can operate to obtain a point of capture (POC) from a position of sensors (e.g., microphones) at a time of recording. The position of sensors may be obtained: i) from a position of known devices (e.g., cameras) when the sensors are attached thereto; ii) from a position of a 3D sensor when the audio data is recorded at the 3D sensor; iii) from an estimated position, or iv) from agent inputs. In a specific implementation, when audio data is obtained from a sensor (e.g., microphone), the audio integration engine 312 integrates the audio data into a master audio track prepared for the scene model. For example, when each time a new audio track (data) is obtained, the audio integration engine 312 places the audio track at a virtual space-time location within the master audio track that is (ideally) correlated with the real-world source of the audio (and/or the location of the sensor capturing the audio data). In a specific implementation, the audio integration engine 312 places a representation (e.g. icon) representing the audio data obtained by the sensors in association with the calculated POC in the scene model, integrated with the virtual space-time of the scene model. In a specific implementation, the audio integration engine 312 associates each audio track with geographic coordinates corresponding to the calculated POC when the geographic coordinates are obtained and with a master geographic area when the geographic coordinates are not obtained. In the alternative, the audio integration engine 312 may estimate a source from which a sound corresponding to at least a portion of the audio data is generated, and associate the portion of the audio data with the estimated source. Audio tracks may later be augmented by separating first audio from second audio within a track and associating the first and second audio with first and second elements.

In the example of FIG. 3, the additional data integration engine 314 of the media integration engine 308 integrates real world data other than image and audio data into the scene model created by the scene model creation engine 306. In a specific implementation, the other real world data may include temperature data, precipitation data, humidity data, telemetry data, wind data, speed data, acceleration data, smell data, vibration data, etc. In a specific implementation, the additional data integration engine 314 operates to obtain the point of capture (POC) from position of sensors (e.g., microphones, thermometers, et al.) at the time of sensing, and associates the obtained data with the POC or the master geographic location of the scene model. In a specific implementation, the other real world data may be obtained at the time when image data for creating the scene model are captured by a sensor, or later in time after the image data for creating the scene model are captured by a sensor. In a more particular example, a DNA test result obtained later based on analysis of a real-world object can be introduced into the scene model as metadata of an element corresponding to the real-world object.

In the example of FIG. 3, the object recognition subsystem 316 is intended to represent specifically-purposed hardware and software that carries out object recognition with respect to objects included in a scene model. In a specific implementation, the object segmentation engine 318 of the object recognition subsystem 316 detects objects in the elements and composed scene model and segments the detected objects into individual objects. In a specific implementation, the object searching engine 320 of the object recognition subsystem 316 searches for one or more candidate model objects corresponding to each of the segmented objects from the object library 324, where model object data is stored. In a specific implementation, the object matching engine 322 matches data of each of the segmented objects (e.g., point cloud data or mesh data) with data of the corresponding candidate model objects (e.g., point cloud data or mesh data) obtained from the object library 324 and recognizes a candidate model object that is a closest match to features of the segmented object. An element corresponding to the segmented object can be provided with metadata for the closest match or probabilities for a set of possible matches. In a specific implementation, the active learning engine 326 of the object recognition subsystem 316 accumulates calculation results obtained from the object segmentation engine 318, the object searching engine 320, and the object matching engine 322, and uses the accumulated calculation results for higher calculation accuracy by each of the object segmentation engine 318, the object searching engine 320, and the object matching engine 322. In a specific implementation, the active learning engine 326 further solicits agent inputs regarding the object recognition process and accuracy thereof.

In a specific implementation, the object recognition subsystem 316 enables completion of object portions that are not visible in image data obtained from sensors (e.g., object portions that opposite to object portions facing POC, object portions that are outside FOV). When a visible portion of the object does not provide sufficient data to supplement the non-visible portion of the object with adequate reliability (threshold for adequate reliability will depend upon implementation- and/or configuration-specific factors and may be set to infinity, or some other unattainable threshold value, if constructive certainty is never adequate), the object recognition subsystem 316 may configure the non-visible portion as a grayed-out portion. In a specific implementation, the object recognition subsystem 316 switches configuration of a non-visible portion of an object between a supplemented portion and a grayed-out portion depending on a user setting. This functionality of switching between the supplemented portion and the grayed-out portion may help an audience member to switch a scene model based on whether or not supplementing of the non-visible portion of an object is scientifically reliable and admissible as evidence in terms of an evidence rule (e.g. Daubert rule). At least conceptually, the switch can be accomplished using a filter to exclude (filter out), highlight (gray out), or present (do not filter) constructive recreation.

In a specific implementation, the object recognition subsystem 316 carries out object ontology with respect to each recognized object to classify the object by hierarchical levels. In an example, when a recognized object is Colt M1911 pistol, the recognized object is classified as firearms in a first hierarchical level, as a pistol in a second hierarchical level, as a product of Colt's Manufacturing Company in a third hierarchical level (e.g., manufacturer level). In addition, any other relevant attribute information (e.g., manufactured year, caliber size, etc.) can be used for the hierarchical levels. In another example, when a recognized object is a fossil of a brachiosaurus, the recognized object is classified as a fossil in a first hierarchical level, as a dinosaur in a second hierarchical level, as Jurassic Morrison Formation in a third hierarchical level, and other features (e.g., era, dating, etc.) can be used for the hierarchical levels. In a specific implementation, the object recognition subsystem 316 enables, based on the classification of recognized objects, a audience member to search an object in a scene model using the hierarchical levels or the name of the object as a key. In a specific implementation, a virtual user interface (UI) to input a search key may be presented in the scene by the object recognition subsystem 316.

In a specific implementation, the object recognition subsystem 316, more particularly the object matching engine 322 thereof, compares an object that has been recognized and classified through the object recognition process and a hypothetical object having features described by agent inputs, and detects matching features and non-matching features between the recognized object and the hypothetical object. In an example situation, this functionality provides a way to determine witness testimony accuracy.

In a specific implementation, the event recognition engine 328 carries out ontological event categorization with respect to each recognized object to classify the event of the recognized object by each of hierarchical levels, in a manner similar to the object classification carried out by the object recognition subsystem 316. The event recognized by the event recognition engine 328 may be any action in association with a recognized object, such as moving, swinging, rotating, lighting, flashing, making noises, melting, evaporating, solidifying, decaying, changing color, and so on. In addition, any other relevant attribute information (e.g., a time line when the event occurred, and etc.) can be used for the hierarchical levels. Objects capable of self-movement (including human actors) and/or objects with differing mechanical properties can have different movement ontologies.

In a specific implementation, the event recognition engine 328 tracks movement in association with objects in a scene model. For example, when a person is moving around a real world site, where multiple sensors are set to capture image data of the real world site, entry to and exit from each FOV of sensors can be tracked and timestamped.

In a specific implementation, the event recognition engine 328 carries out comparison between an event of an object that has been recognized and classified through the event recognition process and a hypothetical event of the object described by agent inputs, and detects matching features and non-matching features between the recognized event and the hypothetical event. In an example situation, this functionality provides a way to determine witness testimony accuracy.

In an example of operation, a system such as is illustrated in FIG. 3 operates as follows. The scene model creation engine 306 creates a scene model based on real world image data obtained from sensors, which are stored as elements in the element datastore 302. The media integration subsystem 308 integrates and synchronizes media data of the elements into the scene model stored in the scene datastore 304. Specifically, the image integration engine 310 integrates and/or synchronizes real world image data of the elements stored in the element datastore 302 into the scene model, the audio integration engine 312 integrates and/or synchronizes real world audio data of the elements into the scene model, and the additional data integration engine 314 integrates and/or synchronizes other real world data of the elements into the scene model.

Continuing the example of operation, the object recognition subsystem 316 recognizes objects included in the scene model to better conform elements (and sub-elements) to specific real-world objects (and object components). Specifically, the object segmentation engine 318 detects objects in the scene model and segments the detected objects into individual objects, the object searching engine 320 searches for one or more candidate model objects corresponding to each of the segmented objects from the object library 324, the object matching engine 322 compares parameters of the segmented objects with parameters of the corresponding candidate model objects obtained from the object library 324 to obtain a match probability or probabilities, and the active learning engine 326 accumulates calculation results and uses the accumulated calculation results for higher calculation accuracy. The event recognition engine 328 recognizes events of the recognized objects included in the scene model, and the elements and scene models are updated accordingly.

Figure 4:
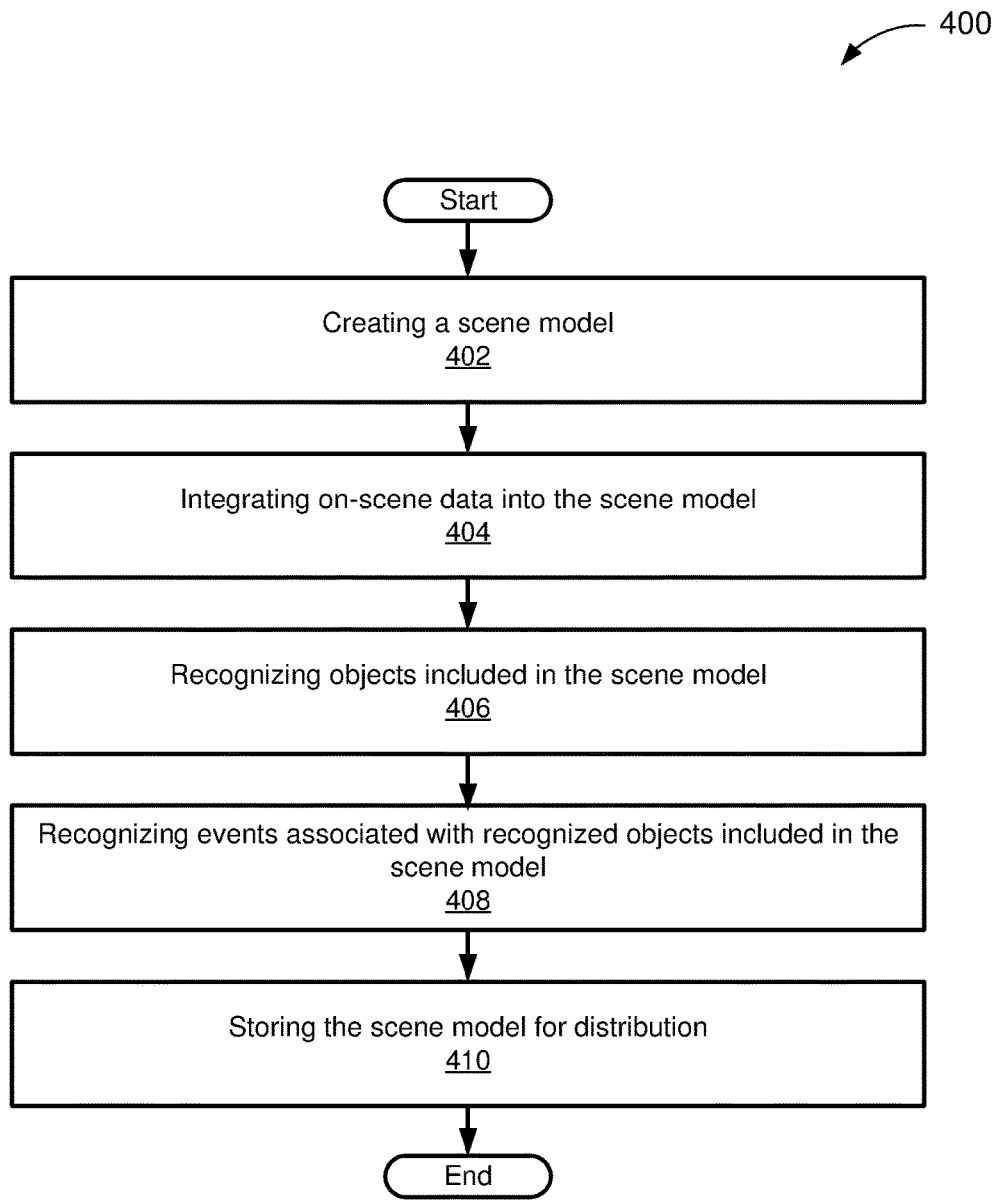
FIG. 4 depicts a flowchart of an example of a method for synchronous scene composition.

FIG. 4 depicts a flowchart 400 of an example of a method for synchronous scene composition. The flowchart 400 starts at module 402 with creating a scene model. In a specific implementation, the scene model is created from objects identified from real world stimuli detected by sensors. For example, the real world stimuli can be electromagnetic radiation obtained by a 3D scanner that generates point cloud data or by one or more 2D or 3D cameras and stitched together using photogrammetry techniques to generate mesh data, and objects can be identified from the point cloud data or mesh data. Instead or in addition, the scene model can be created using synthetic elements, such as objects used to direct audience member attention, but that are not actually correlated with any real world stimuli. A scene model can, at least conceptually, also be a relatively sparse virtual space-time due to a lack of sensor data. For example, a case file could be opened for a crime scene investigation that involves identifying a scene prior to obtaining any on-scene data, and the scene can be developed over time as additional data is received. In such an example, the scene model can be thought of as a frame on which elements can be positioned.

In the example of FIG. 4, the flowchart 400 continues to module 404 with integrating on-scene data into the scene model. The on-scene data can include media data, such as image data obtained through 2D/3D images, audio data obtained through microphones, or other data obtained from on-scene sensors. Media data can also be added asynchronously at a later time, such as by an investigator who adds a voice memo after leaving the scene or a forensics investigator who takes a supplemental photo of a murder weapon. Media data can also be taken from data sources that are not directly drawn from elements or actors, such as an image of a firearm that is alleged to have been used (though no image of the alleged murder weapon is available), taken from an object library. In the latter case, the object will typically have been recognized, as described in the next module. The on-scene data can also include non-media data, such as a memo created by an on-scene agent. It may be noted that most non-media data can be represented in graphical form (as media), but the non-media data itself has no identifiable real-world physical structure (though it can typically act as metadata for an element that is correlated to a real world object with a physical structure).

In the example of FIG. 4, the flowchart 400 continues to module 406 with recognizing objects included in the scene model. In a specific implementation, detected objects are matched with reference objects and a best matching reference object may be recognized (identified) as the detected object. Elements associated with detected objects can include probabilities associated with reference objects indicative of the likelihood the detected object is or shares characteristics with one or more reference objects. Human or artificial agents may be sufficiently capable or confident to recognized and identify objects. In a specific implementation, recognized objects are classified in one or more hierarchical levels, so that object searching based on the hierarchical levels can be carried out. The classification can occur based upon identifying an object at at least one hierarchical level. For example, categorizing an object as "an assault rifle" is a higher hierarchical level than as a "AK-47."

In the example of FIG. 4, the flowchart 400 continues to module 408 with recognizing events associated with recognized objects included in the scene model. Associations with an object can include the object taking an action (the event), the object being subjected to an action (the event), or the object being in some degree of proximity to an action (the event). Events can be limited by sensor capabilities. For example, an object that disappears may disappear because a sensor is no longer capable of detecting it, even if the object did not move. In a specific implementation, an event (action) associated with one or more recognized objects is recognized and the recognized event is classified in one or more hierarchical levels, so that an event search based on the hierarchical levels can be carried out. The classification can occur based upon identifying an event at at least one hierarchical level. For example, categorizing an object as "having been moved" (potentially due to an early image showing the object and a later image not showing the object) is at a higher hierarchical level than as "picked up and carried away by an actor." (The latter may be characterized as multiple events.)

In the example of FIG. 4, the flowchart 400 ends at module 410 with storing the scene model for distribution. In a specific implementation, the scale of the scene model is set to a scale corresponding to a real world geography and time period(s), both of which can be either continuous or discrete. A master scene model, with all elements and areas over the entire time period(s), may or may not be made available for distribution. For example, a scene model stored for distribution may filter out elements, geographies, or times audience members are not authorized to perceive. Alternatively, a scene model elements are associated with user credentials, so that audience members with appropriate user credentials have selective access to a master scene model.

Figure 5:
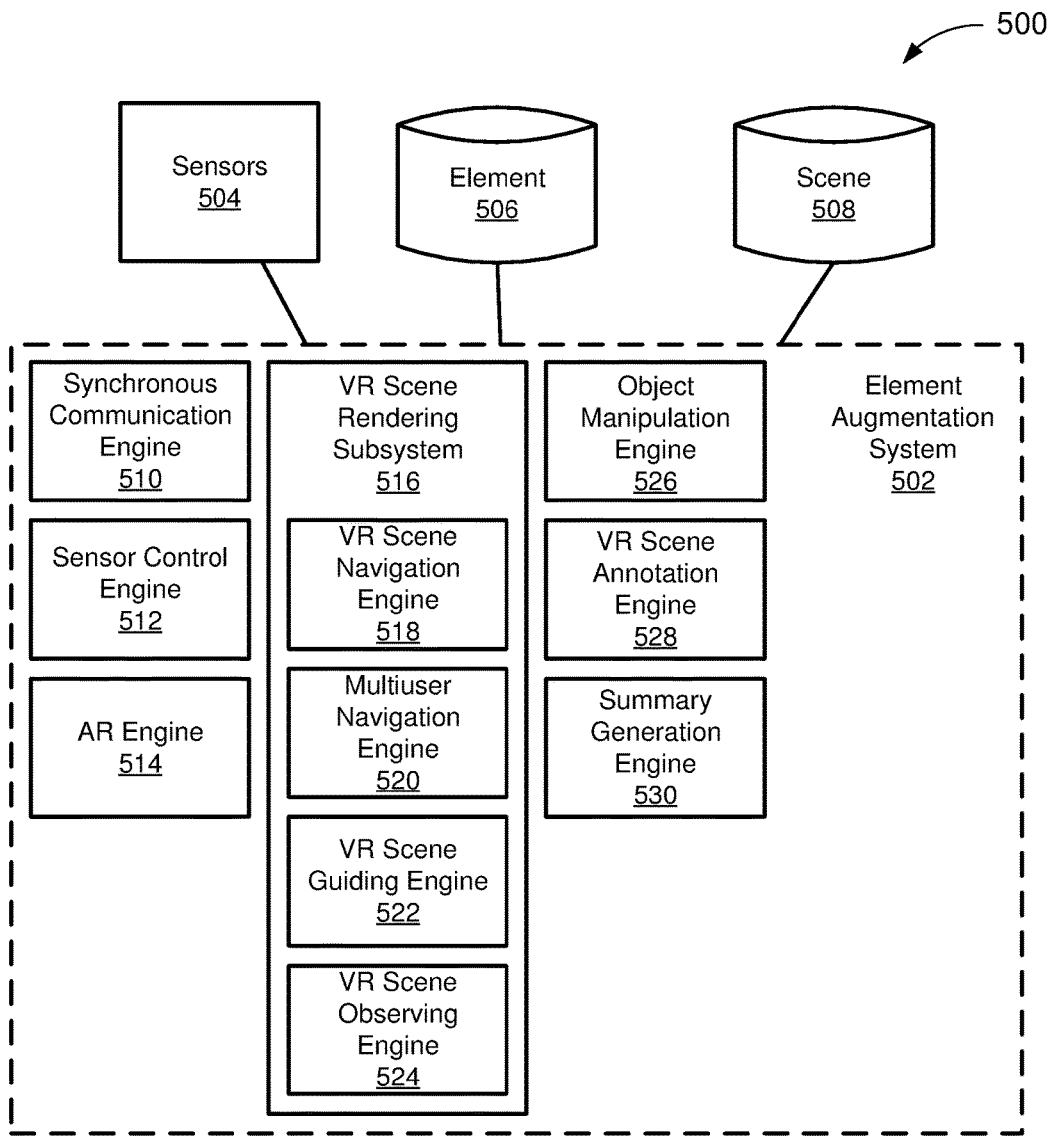
FIG. 5 depicts a diagram of an example of a VR experience system.

FIG. 5 depicts a diagram 500 of an example of an on-scene element augmentation system. The diagram 500 includes an element augmentation system 502, sensors 504 coupled to the element augmentation system 502, an element datastore 506 coupled to the element augmentation system 502, and a scene datastore 508 coupled to the element augmentation system 502. The element augmentation system 502 includes a synchronous communication engine 510, a sensor control engine 512, an AR engine 514, a VR scene rendering subsystem 516, which includes a VR scene navigation engine 518, a multiuser navigation engine 520, a VR scene guiding engine 522, and a VR scene observing engine 524, an object manipulation engine 526.

In the example of FIG. 5, the element augmentation system 502 is intended to represent specifically-purposed hardware and software used for synchronous scene composition. Synchronous scene composition involves synchronous communication between agents to build a virtual scene corresponding to a real world scene at which at least one of the agents is located. The elements of the virtual scene are augmented in real-time and element data associated with the scene is available to the agents as the virtual scene is augmented. The sensors 504, element datastore 506, and scene datastore 508 can be implemented as described with reference to the sensors 104 (FIG. 1), the element datastore 106 (FIG. 1), and the scene datastore 108 (FIG. 1).

The synchronous communication engine 510 is intended to represent a communication path interface for a first agent. The first agent is an on-scene agent that uses the synchronous communication engine 510 to access at least a portion of an element from the element datastore 506 (accessed element data). The first agent may or may not access the scene datastore 508, depending upon implementation- and/or configuration-specific factors. The first agent provides data that is used to generate one or more new elements for storage in the element datastore 506 (element creation data and/or instructions) or to augment existing elements in the element datastore 506 (element update data and/or instructions). Although it is generally desirable to keep a record of all activity in at least some implementations, such as crime scene investigation implementations, the first agent may also provide data that is used to delete elements from the element datastore 506 (element deletion data and/or instructions). Thus, with limitations that are implementation- and/or configuration-specific, the first agent can have create, read, update, and delete (CRUD) access to the element datastore 506 via the synchronous communication engine 510 and may or may not have CRUD access to the scene datastore 508.

A second agent can communicate with the first agent while the first agent is on-scene. The second agent can also have CRUD access to the element datastore 506 or scene datastore 508 while the first agent is on-scene, giving the first agent access to updated element data while on-scene. The second agent can also provide instructions or requests to the first agent such that the first agent can act on the instructions or requests while on-scene. For example, the second agent could request the first agent gather an organic sample or take a picture. The instructions or requests can be associated with spatial coordinates the first agent can act upon using AR or verbal queues. For example, the first agent can be instructed to take a picture of an object in the north-east corner of the dining room or to take a picture of an object identified with an arrow (in AR).

It is assumed for illustrative purposes the first and second agents are authorized to access all elements, including metadata, as well as other resources, without restriction. However, just as a VR presentation can be filtered (see, e.g., the scene filtering system 116 of FIG. 1), depending upon implementation- and/or configuration-specific factors, agents can be limited by access rights.

The sensor control engine 512 is intended to represent a command interface and associated hardware and (if applicable) software for the first agent to control one or more of the sensors 504. The command interface includes, for example, a camera application on a smartphone that is used to command the smartphone to take a picture, an activation switch of a 3D scanner, or a wireless activation switch for a sensor. The second agent may or may not also have access to the sensor control engine 512.

The AR engine 514 is intended to represent hardware and typically software that is used to display at least a portion of the element datastore 506 to the first agent in correlation with the real world scene. Advantageously, as the element datastore 506 is updated by the first agent or the second agent, the AR engine 514 provides AR using the updated data to the first agent while the first agent is still on-scene. The second agent may or may not also have access to the AR engine 514.

The VR scene rendering subsystem 516 is intended to represent hardware and software used to render a scene from the scene datastore 508 to VR playback devices. The VR scene rendering subsystem 516 can be considered optional in synchronous mode because the first agent, who is on-scene, may have no need for VR presentation (favoring AR that augments the real world scene) and the second agent may also be on-scene and may have no need for VR for similar reasons. However, if the second agent is off-site, it may be desirable to provide the second agent with VR capabilities. Moreover, the VR scene rendering subsystem 516 is assumed to be essential in asynchronous mode for at least some implementations, such as when the scene is built for the purpose of assisting off-site audience members to experience a crime scene that is no longer extant in the real world.

The VR scene navigation engine 518 of the VR scene rendering subsystem 516 enables audience members to navigate through a VR scene. In a specific implementation, the VR scene navigation engine 518 causes every movement and step taken by an audience member in a real world to be represented in a similar same scale movement within the VR scene (hereinafter referred to as step-by-step walking). It may be noted that step-by-step walking is often confined within a safe area and navigation controls must be used to move a scene around to enable continuous walking. In a specific implementation, the VR scene navigation engine 518 enables an audience member to review or play media (e.g., pictures, video, relevant environmental data, etc.) placed in the VR scene (hereinafter referred to as media review), for example, by selecting an icon at a location in the VR scene associated with the media.

In a specific implementation, the VR scene navigation engine 518 enables an audience member to "teleport" to a desired point in the VR scene (without the audience member physically walking to a corresponding point in a real world). For example, upon an audience member selecting a destination point in the VR scene, a position of the audience member in the VR scene is instantly moved to the destination point and a new FOV is presented to the audience member's VR playing device. In a specific implementation, the VR scene navigation engine 518 enables an audience member to "teleport" to a destination position, by providing the audience member a scaled-down VR scene (dollhouse VR scene) within the normal-scale VR scene and allowing the audience member to move the audience member's avatar within the scaled-down VR scene to a corresponding destination position within the scaled-down VR scene. For example, upon an audience member operation to invoke a dollhouse teleportation, the VR scene navigation engine 518 enables an audience member to grab the audience member's avatar in a dollhouse VR scene and move the audience member's avatar to a desired location within the dollhouse VR scene. After a destination position of the audience member's avatar is settled, the a position of the audience member in the normal-scale VR scene is instantly moved to a point corresponding to the destination position in the dollhouse VR scene and a new FOV is presented to the audience member's VR playing device.

In a specific implementation, the VR scene navigation engine 518 enables an audience member to gradually move in a pointed direction in the VR scene (without the audience member physically walking to a corresponding point in a real world), and this move is referred to as "directed move" hereinafter. For example, upon an audience member pointing a direction in the VR scene and indicating a moving speed in the VR scene, a position of the audience member is moved in the pointed direction at the indicated speed, and gradually shifting FOVs are presented to the audience member's VR playing device. In a specific implementation, the VR scene navigation engine 518 enables an audience member to control the VR scene with verbal commands and/or gestures. For example, upon an audience member verbally commanding to show all metal objects with emphasis (e.g. highlight), the VR scene navigation engine 518 causes objects that are characterized as metal objects to be displayed in the VR scene with emphasis. For example, upon an audience member verbally commanding to face toward south, the VR scene navigation engine 518 causes the FOV of the audience member to be changed to a new FOV facing south. For example, upon an audience member making a hand gesture to volume up audio of the VR scene, the VR scene navigation engine 518 causes audio of the VR scene to be increased. For example, upon an audience member verbally calling up a particular identifier of media (e.g., picture, video, dictionary), the VR scene navigation engine 518 causes the called-up media to be displayed in the VR scene. Those example of audience member interaction with the VR scene and other audience member interaction with the VR scene described in this paper are not limited to particular interfaces, and any interfaces, including but not limited to, keyboard, a handheld controller, a hand signal sensor, a gesture sensor, a voice recognition system, a gaze angle sensor, and so on, can be employed.

The multiuser navigation engine 520 of the VR scene rendering subsystem 516 enables multiple audience members to be immersed in the same VR scene concurrently. In a specific implementation, the multiuser navigation engine 520 supports functions supported by the VR scene navigation engine for audience members in the VR scene, such as, step-by-step walking, media review, teleportation, dollhouse teleportation, directed move, and verbal/gesture command. That is, an audience member in the VR scene is capable of operating those functions independently from other audience members.

In a specific implementation, the multiuser navigation engine 520 further enables multiple audience members to interact with each other in the VR scene. One particular way of multiuser interaction is verbal communication. In a specific implementation, an audience member who is immersed in a VR scene using a VR playback device can have his or her voice to be delivered to a target audience member immersed in the VR scene by a voice message, by selecting the target audience member physically or virtually. The voice can be captured by the VR playback device (e.g., microphone attached to or embedded in the VR playback device) that the originating audience member uses, and reproduced by a VR playing device that the target audience member uses.

Another particular way of interaction is visual communication. In a specific implementation, an audience member who is immersed in a VR scene using a VR playback device can have a text message to be delivered to a target audience member by a text message. The text message originated by an audience member can be input by voice, keyboard typing (using a physical keyboard or a virtual keyboard), handwriting (using a physical pad or a virtual pad). The text message delivered to the target audience member can be displayed within the VR scene as a pop-up object that can be viewable selectively by the target audience member (in some implementations, not viewable by non-target audience members). Depending upon implementation-specific or other considerations, the voice and/or text message can be communicated between two audience members and among three or more audience members. That is, a message in a communication can be delivered to multiple audience members. For example, an attorney who is being immersed in a VR scene of a crime scene that is being played in a courtroom can send a confidential text message to a client (e.g., defendant), who is also being immersed in the VR scene.

In a specific implementation, an audience member who is immersed in a VR scene using a VR playback device can have a gesture message delivered to a target audience member immersed in the VR scene, by having an avatar of the originating audience member that appears in the VR scene to perform a gesture. In a specific implementation, the multiuser navigation engine 520 maintains logs of communication among audience members, in a searchable format, so the logs can be retrieved later. In a specific implementation, the multiuser navigation engine 520 further enables multiple audience members to exchange (swap) FOVs with each other (without changing respective audience member position and orientation).

The VR scene guiding engine 522 of the VR scene rendering subsystem 516 enables one audience member (a guide) to guide one or more other audience members (followers) in the VR scene. In a specific implementation, the VR scene guiding engine 522, similarly to the multiuser navigation engine 520, enables multiple audience members to be immersed in the same VR scene; however, differently from the multiuser navigation engine 520, forces followers to follow a guide's instructions, FOV, or activity. For example, a guide may require followers to move with the guide. In a specific implementation, the relative positions among followers are preserved when moved by the guide, but FOVs are repositioned as appropriate for the new group location. Depending upon implementation-specific or other considerations, a follower may move in the VR scene when not slaved to a guide. For example, when the guide invokes a teleport for a group of followers, any teleporting action invoked by a follower is preemptively suspended until the group gets teleported according to the teleportation invoked by the guide. A teleporting action invoked by followers may be allowed by the guide after the group teleportation is complete.

Depending upon implementation-specific or other considerations, the VR scene guiding engine 522, operating in conjunction with the multiuser navigation engine 520, enables followers to exit and reenter a guided tour provided by a guide. For example, when a follower does not feel like looking at a FOV of a guide (e.g., a gruesome object), the follower may change FOV from that of the guide to a preferred FOV different from the FOV of the guide. Thus, while the guide can control a default FOV (e.g., what is in front of a follower), it may be desirable to allow followers to look away. In a specific implementation, the guide may also force an object into follower FOVs such that the object moves with changes in FOV (e.g., an instruction to remove a VR headset could be displayed in the center of a FOV no matter where a follower looks).

The VR scene guiding engine 522 of the VR scene rendering subsystem 516 enables communication among audience members in a similar manner as the multiuser navigation engine 520.

The VR scene observing engine 524 of the VR scene rendering subsystem 516 enables an authorized audience member (an observer) to navigate the VR scene while invisible to another audience member. In a specific implementation, no avatar of an observer appears in a VR scene, such that other audience members who are immersed in the VR scene cannot see the observer. In a specific implementation, the VR scene observing engine 524 supports functions supported by the VR scene navigation engine for audience members, such as step-by-step walking, media review, teleportation, dollhouse teleportation, directed move, and/or verbal/gesture command. It may be noted the navigation techniques of observers and other audience members need not be the same. That is, observers are capable of operating those functions independently from other audience members. Depending upon implementation-specific or other considerations, the VR scene observing engine 524 may or may not support communication functions between multiple observers and/or between an observer and an audience member who is not an observer.

In the example of FIG. 5, the object manipulation engine 526 is intended to represent specifically-purposed hardware and software that enables manipulation of objects within a scene. In a specific implementation, the object manipulation engine 526 provides haptic feedback when an audience member reaches out to an object in a VR scene and a body part (e.g. hand) collides with the object, and enables the audience member to "grab" the object and move the object (e.g., raising the object and placing the object close to the audience member's "eyes") to inspect the object. In a specific implementation, the object manipulable by audience members in the VR scene may be a copy (replica) of the object. That is, even when an audience member grabs an object, the object may still exist at the original position from the perspective of other audience members, and the original scene model can be preserved regardless of manipulation of objects in the VR scene. This functionality also enables multiple audience members to independently manipulate the same object concurrently. In contrast, in a specific implementation, the object manipulation engine 526 may enable authorized audience members to modify the scene model by adding, updating, moving, or removing objects in the VR scene. For example, an authorized user may turn on a TV in a VR scene or move a TV from the living room to the kitchen. The objects in the VR scene may include objects scanned or captured from a real world (hereinafter referred to as scanned objects), synthetically-created objects that are not the scanned objects (hereinafter referred to as synthetic objects), or hybrid objects that include both scanned and synthetic components. Scanned, synthetic, and hybrid objects are, at least conceptually, all part of the element datastore 506.

In a specific implementation, an agent uses the object manipulation engine 526 to retrieve an object from the element datastore 506 and places the object in a VR scene at a position designated by the agent. In a particular example, a synthetic object may include a virtual DNA swab or a virtual gun that was not found in the real world site. Depending upon implementation-specific or other considerations, placement of a synthetic object can create a hypothetical VR scene that could have been. In an example, the object manipulation engine 526 enables an agent to place an object in the VR scene at a particular point in time and a particular position, and make the placed object move in a particular manner during a particular period of time, as a simulation of an object. In another example, the object manipulation engine 526 enables an agent to place a particular person in the VR scene at a particular point in time and a particular position, and make the placed person act in a particular manner during a particular period of time, as an impersonation. In a specific implementation, data of the placed object and/or the placed person are stored in datastore and managed as a media file, and a representation (e.g., icon) of the media file is presented in the VR scene. The media file of the simulated object and/or the impersonation can be played, paused, forwarded, reversed, speeded up, and speeded down, in a similar manner as other media files, by operating the representation of the media file.

In a specific implementation, the synthetic object may be a measuring item (e.g., a measuring tape) to measure objects (e.g., scanned objects) in the VR scene. In a more particular example, the synthetic object may be a laser pointer having a tube shape, such that the laser pointer can be put in a bullet hole existing in the VR scene and a trajectory of a bullet can be identified based on the laser. In another specific implementation, the synthetic object may be any item that an audience member uses to demonstrate how to perform a task with the item in the VR scene. For example, in a situation where a guide and one or more followers are in the VR scene, the object manipulation engine 526 operates in conjunction with the VR scene guiding engine 522, such that the guide can demonstrate how to investigate the VR scene using a device of the synthetic object, and a follower can observe how the task is performed using the device. Similarly, an observer may be capable of placing objects as desired to assist in a learning task.

In a specific implementation, the object manipulation engine 526 enables an audience member to replace a scanned object with a hybrid object or provide a synthetic object to represent a (predicted) real world object that has not been sensed. The synthetic object may be a predicted object that would have been at a certain previous point in time before the time of the real world site, or an object having features described based on user inputs or statements. In a particular example situation, this functionality of the object manipulation engine 526 helps to distinguish a scanned object with a hypothetical object described based on witness testimony.

In a specific implementation, the object manipulation engine 526 operates in conjunction with the multiuser navigation engine 520 or the VR scene guiding engine 522, to enable an audience member to place an object (e.g., a synthetic object) within the audience member's FOV and mirror the audience member's FOV to other audience members' FOVs. For example, when a guide moves a synthetic object (e.g., a document) within the guide's FOV, the guide's FOV including the synthetic object can be "mirrored" to follower FOVs. That is, the same FOV is presented to the followers.

In a specific implementation, the object manipulation engine 526 operates in conjunction with the multiuser navigation engine 520 or the VR scene guiding engine 522, to enable a user to place an object within the user's FOV and present a relative FOV to other users. For example, when a guide user moves a synthetic object (e.g., a knife) within the guide user's FOV, the manipulation action of the guide user is reflected to FOV of each of follower users, i.e., a different FOV is presented to each of the follower users, depending on the relative position of the follower users in the VR scene.

In a specific implementation, the object manipulation engine 526 operates in conjunction with the multiuser navigation engine 520 or the VR scene guiding engine 522, to enable multiple audience members to manipulate a single object cooperatively. For example, two guides (or two synthetic object "coroners") can lift up an object (e.g., a dead body) to demonstrate to followers how coroners lift bodies.

In the example of FIG. 5, the VR scene annotation engine 528 is intended to represent specifically-purposed hardware and software that enables audience members (human and/or artificial) to add annotations to VR scenes obtained from the VR scene datastore 508. In a specific implementation, the VR scene annotation engine 528 enables an audience member to create free-style marks by using hand gestures using tools, such as 3D pencils, 3D highlighters, 3D post-its, etc. In another specific implementation, the VR scene annotation engine 528 enables an audience member to select one of default or previously-created marks by using an audience member's hand menu user interface (UI), with which the audience member can toggle and select a mark from a list of marks. In still another specific implementation, the VR scene annotation engine 528 enables an audience member to modify or edit (e.g., reposition, remove) default or previously-created marks that have been attached to a VR scene by using an audience member's hand menu user interface (UI), with which the audience member can modify or edit the mark. In still another specific implementation, the VR scene annotation engine 528 operates in conjunction with the multiuser navigation engine 520 or the VR scene guiding engine, such a marker can be instantly viewable by other audience members in the VR scene. This functionality is useful when one audience member is joining the VR scene from a remote location different from a real world place corresponding to the VR scene, and instructs another audience member who is also joining the VR scene (AR scene) at the real world place.

In a specific implementation, the VR scene annotation engine 528 enables an audience member (human and/or artificial) to attach a media file (audio, video, documents, 3D scan data) and any other representation relevant information to a VR scene and place a representation (e.g., icon) of the media file within the VR scene. For example, an audience member can select a media file to be attached to a VR scene from a library and select an object to which the media file is to be attached. Upon selection of the media file and the object, a representation of the media file is presented in the VR scene in association with the selected object (e.g., at a position adjacent to the object). In a specific example, the media file is a close-up picture of an object (e.g., a bullet hole), or a report document (e.g., ballistics report) of the object (e.g., a bullet hole). In another specific example, the media file is a photographic image captured at a location remote from a real world location for which the VR scene is created (e.g., an image of a police investigation board showing relevant information of a case).

In a specific implementation, the VR scene annotation engine 528 enables an audience member to attach a voice memo to a VR scene and place a representation (e.g., icon) of the voice memo within the VR scene. In an example, an audience member can select an object in a VR scene or an object synthetically created as a target object with which the voice memo is to be associated, and record the audience member's voice through a microphone of a VR playing device that the user is using. In another example, a user can record the audience member's voice and then select an object with which the recorded voice is to be associated. A representation (e.g., icon) of the voice memo is presented in the VR scene at a location associated with the object, and the audience member who made the voice memo or any other audience members who are authorized to access the voice memo can play back the voice memo by selecting the representation. In still another example, a voice memo may be generally associated with a VR scene, and may not be associated with a specific object or a specific location within the VR scene.

In a specific implementation, the VR scene annotation engine 528 enables an audience member (human and/or artificial) to attach a text memo to a VR scene and place a representation (e.g., icon) of the text memo within the VR scene. In an example, an audience member can select an object in a VR scene or an object synthetically created as a target object with which the text memo is to be associated, and recognize the audience member's text input through a physical or virtual keyboard or a dictation interface. In another example, an audience member can input a text memo and then select an object with which the text memo is to be associated. A representation (e.g., icon) of the text memo is presented in the VR scene at a location associated with the object, and the audience member who made the text memo or any other audience members who are authorized to access the text memo can open and review the text memo by selecting the representation (or read the text being displayed in the VR scene if the text memo is saved as a label rather than a text file). In still another example, the VR scene annotation engine 528 operates to dictate an audience member's verbal input into a text memo, and the text memo can be attached to a VR scene. In still another example, a text memo may be generally associated with a VR scene, and may not be associated with a specific object within the VR scene.

In a specific implementation, the VR scene annotation engine 528, operating in conjunction with the object manipulation engine 526, and with the VR scene guiding engine 522, generates a script based on an activity of an audience member (e.g., a guide or observer) performed on an object in the VR scene. For example, when a guide shows demonstration of how to handle an object in the VR scene (e.g., collecting blood sample), the VR scene annotation engine 528 enables a follower to create a script of an activity to be performed thereby based on the guide's activity. The follower can refer to the script when the follower is requested to perform the same activity as the guide user did. This functionality of generating a script benefits trainees of a training program to efficiently create a script based on the activity of the guide (e.g., trainer).

In a specific implementation, the VR scene annotation engine 528, operating in conjunction with the object manipulation engine 526, and with the VR scene observing engine 524, generates a script based on an activity of a user performed on an object with the VR scene, without being noticed by the user. For example, when a user, e.g., a trainee of a training program, performs a task required to take, the VR scene annotation engine 528 enables an observing user (e.g., trainer) to create a script of an activity that has been performed by the user being observed. The observing user can refer to the script when the observing user evaluates performance of the user being observed. In a specific implementation, the VR scene annotation engine 528 compares the generated script with a reference script corresponding to an exemplar activity to be performed, and generates evaluation result (e.g., grade) based on the comparison. More specifically, the VR scene annotation engine 528 compares each step of activity performed by the user being observed and an order of the steps of the performed activity with each step of an exemplar activity and an exemplar order, respectively. This functionality of generating a script benefits an observing user (e.g., a trainer of a training program) to efficiently create a script and/or make an evaluation result based on the activity of the user being observed (e.g., trainer).

In the example of FIG. 5, the summary generation engine 530 is intended to represent specifically-purposed hardware and software that creates a summary report for a session of being immersed into a VR scene by one or more users (human and/or artificial) and/or a summary report for each user and/or each object involved in the session and/or the scene overall. In this paper, a session is intended to be a period time during which one or more users are immersed in a VR scene, e.g., a period of time between a first login to the VR scene to a last logout of the VR scene. In a specific implementation, the summary generation engine 530 is configured to create a summary report that summarizes a session of a VR scene in which one or more users participate to be immersed. The summary report, for example, includes each user's movement in the VR scene, which is generated by the summary generation engine 530 operating in conjunction with the VR scene rendering engine 516. The summary report, for example, includes each object's movement in the VR scene which is generated by the summary generation engine 530 operating in conjunction with the VR object manipulation engine 526. The summary report, for example, includes each annotation attached to the VR scene and/or summary of the attached annotations, which are generated by the summary generation engine 530 operating in conjunction with the VR scene annotation engine 528. The summary report, for example, includes a guided tour video clip that can be seen by a follower user of a group guided by a guide user, and a guide route in the VR scene. The summary reported is created in any data format, and may be a text format for example. In an example situation, this functionality of creating a summary report helps law enforcement agents to efficiently prepare a more coherent report aimed at target audience (e.g., jury) of the report.

In a specific implementation, the summary generation engine 530 is configured to create a summary report that summarizes one user's activity in the VR scene. The summary report, for example, includes a user's movement in the VR scene, which is generated by the summary generation engine 530 operating in conjunction with the VR scene rendering subsystem 516. The summary report, for example, includes each object's movement manipulated by the user in the VR scene, which is generated by the summary generation engine 530 operating in conjunction with the object manipulation engine 526. The summary report, for example, includes each annotation attached to the VR scene by the user and/or summary of the attached annotations, which are generated by the summary generation engine 530 operating in conjunction with the VR scene annotation engine 528. The summary report, for example, includes a sequence of FOVs presented to the user. The summary reported is created in any data format, and may be a text format for example.

In an example of operation, a system such as is illustrated in FIG. 5 operates as follows. The scene datastore 508 stores data of VR scenes that have been created. A user authorization engine carries out user authentication when a user attempts to access a VR scene stored in the VR scene datastore 508, the VR scene rendering subsystem 516 presents VR scenes obtained from the scene datastore 508 to VR playback devices associated with authorized users, the object manipulation engine 526 enables a VR object in a VR scene to be manipulatable by users in the VR scene, the VR scene annotation engine 528 enables users (human and/or artificial) to add annotations to VR scenes obtained from the scene datastore 508, and the summary generation engine 530 is configured to create a summary report that summarizes a session of a VR scene in which one or more users (human and/or artificial) participate to be immersed. For example, the VR authorization engine determines presentation modes, such as a sole navigation mode, a multiple navigation mode, a guiding mode, and an observing mode, that can be selected by an audience member, determines objects that can be manipulated by the audience member and media that can be played or reproduced by the audience member, and annotation (text, voice, media, etc.) that can be put by an audience member.

In the VR scene rendering engine 516 illustrated in FIG. 5, the VR scene navigation engine 508 enables each of authorized users who are accessing the VR scene to navigate the VR scene, the multiuser navigation engine 520 enables multiple users to interact to each other in the VR scene, the VR scene guiding engine 522 enables one user to guide one or more other users in the VR scene, and the VR scene observing engine 524 enables authorized users who are accessing the VR scene to navigate the VR scene while invisible to other users.

Figure 6:
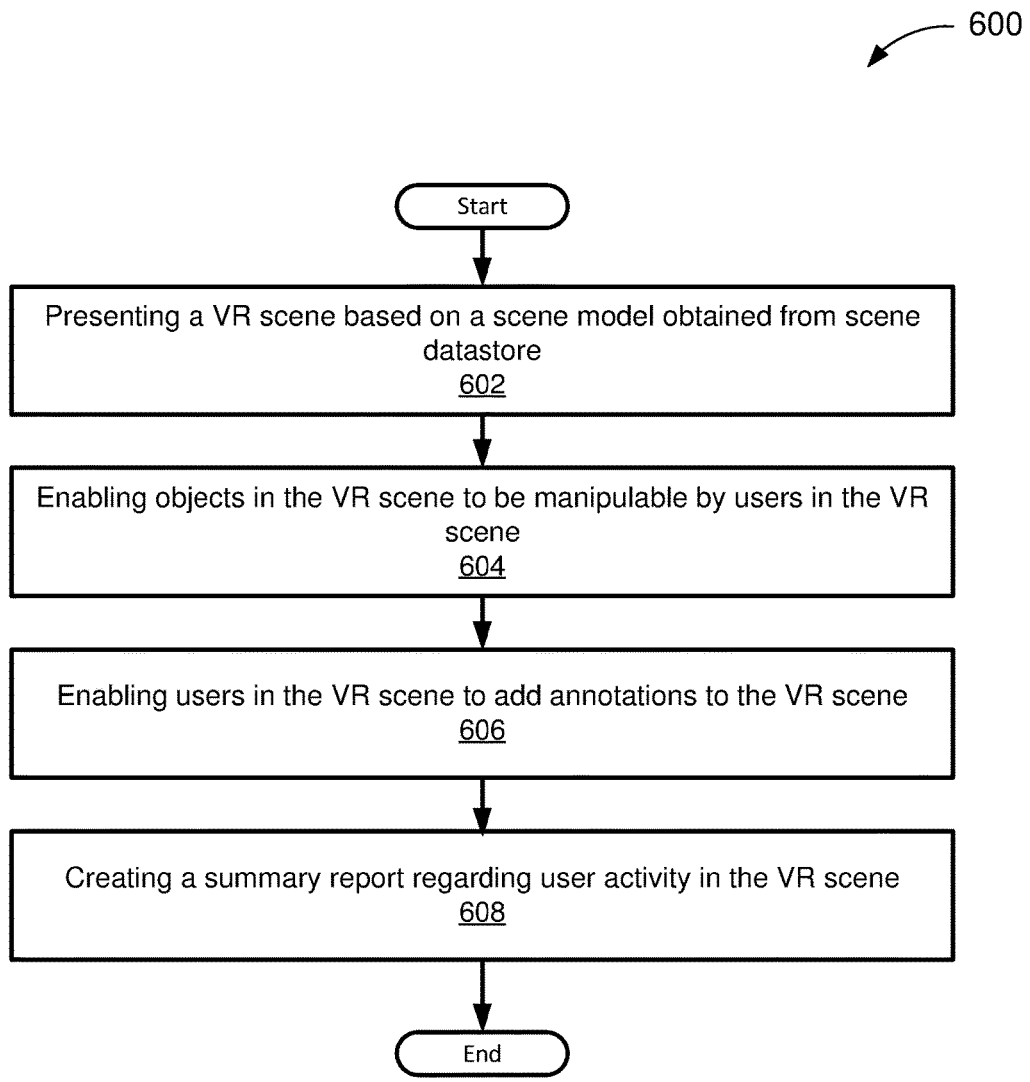
FIG. 6 depicts a flowchart of an example of a method for VR scene presentation and interaction.

FIG. 6 depicts a flowchart 600 of an example of a method for VR scene presentation and interaction. The flowchart 600 starts at module 602 with presenting a VR scene based on a scene model obtained from the VR scene datastore 502 to VR playback devices associated with authorized users. A user is able to navigate through a VR scene by moving around the VR scene, communicate with other users in the VR scene, and force other users to move along with a guide user when a guide tour of a group of users is established activating a guide mode. Depending upon implementation or other considerations, a user is able to be transparent (not viewable from other users), when an observation mode is activated.

In the example of FIG. 6, the flowchart 600 continues to module 604 with enabling objects in a VR scene to be manipulable by users in the VR scene. In a specific implementation, a user is able to move an object included in the VR scene as desired by a user, add a synthetic object to the VR scene, remove an object from the VR scene, sort out objects in the VR scene based on a particular criteria. In a specific implementation, a user is able to present an object manipulated by the user to other users in a VR scene.

In the example of FIG. 6, the flowchart 600 continues to module 606 with enabling users to add annotations to VR scenes. In a specific implementation, a user is able to attach a mark, a media file, a text memo, an audio or a video memo to a VR scene or any specific object within the VR scene. In a specific implementation, a user is able to show a representation (e.g., icon) to review or play the attached annotation within a VR scene, for example, at a location adjacent to an associated object, if any.

In the example of FIG. 6, the flowchart 600 ends at module 608 with creating a summary report for a session of being immersed into a VR scene by one or more users and/or a summary report for each user and/or each object involved in the session. In a specific implementation, the summary report may include a user's movement in the VR scene, each object's movement manipulated by the user in the VR scene, each annotation attached to the VR scene by the user and/or summary of the attached annotations, and/or a sequence of FOVs presented to the user. In a specific implementation, when a summary report is created for an entire session of a VR scene in which a plurality of user logs in at different timings, user activity since a first user logs in the VR scene until a last user logs out of the VR scene is monitored, and the summary report is created upon the last user logging out of the VR scene. In a specific implementation, when a summary report is created for each individual user, user activity since the user logs in the VR scene until the user logs out of the VR scene is monitored, and the summary report is created upon the user logging out of the VR scene.

Figure 7:
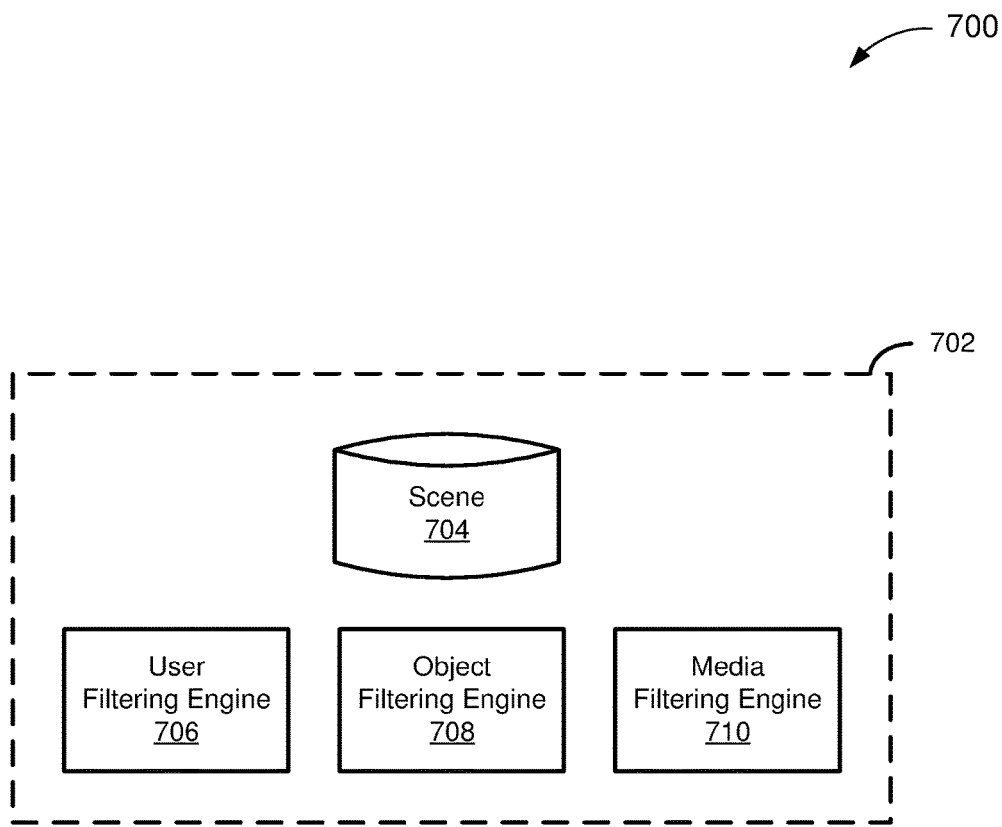
FIG. 7 depicts a diagram of an example of a scene filtering system.

FIG. 7 depicts a diagram 700 of an example of a scene filtering system 702. The scene filtering system 702 includes a scene datastore 704, a user filtering engine 706, an object filtering engine 708, and a media filtering engine 710.

In the example of FIG. 7, the scene datastore 704 can be implemented as described with reference to the scene datastore 108 (FIG. 1) and/or the scene datastore 508 (FIG. 5).

In the example of FIG. 7, the user filtering engine 706 is intended to represent specifically-purposed hardware and software that filters users who are authorized to access a VR scene. In a specific implementation, the user filtering engine 706 assigns a user identifier (e.g., user ID) to each user who has an account to a VR experience system in association with a unique user access level identifier (e.g., level 1, level 2, level 3, . . . ) to categorize user access levels of users, and enables access to a VR scene based on the user identifier and/or assigned user access level identifiers. For example, the user filtering engine 706 disables access to a VR scene by a specific user who has made an unethical conduct in a scene during a VR scene (e.g., an educational VR scene), based on a user identifier of the user. In another example, the user filtering engine 706 enables access to a VR scene by users having a user access level identifier higher than (or equal to) a predetermined threshold (e.g., level 2), and disable access to the VR scene by users having a user access level identifier lower than (or equal to) the predetermined threshold. In a specific example, the user filtering engine 706 assigns a lower access level to certain users (e.g., jury), and a higher access level to other users (e.g., judges and attorneys), to prevent a graphic scene or a VR scene that has too strong influence on an outcome of a case to be observed by jury. In other words, the user filtering engine 706 is able to deny access to a VR scene that is inadmissible as evidence.

In the example of FIG. 7, the object filtering engine 708 is intended to represent specifically-purposed hardware and software that filters objects to be viewable by users in a VR scene from the VR scene. In a specific implementation, the object filtering engine 708 assigns an object identifier (e.g., object ID) to each object in a VR scene in association with a unique object access level identifier (e.g., level 1, level 2, level 3, . . . ) to categorize user access levels of objects, and enables observation of objects in to a VR scene based on the object identifier and/or the assigned object access level identifiers. For example, the object filtering engine 708 disables observation (viewing) of an object having an object identifier by all users in a VR scene. In another example, the object filtering engine 708 enables observation (viewing) of objects having an object access level identifier higher than (or equal to) a predetermined threshold (e.g., level 2), and disable observation (viewing) of other objects having an object access level identifier lower than (or equal to) the predetermined threshold. In still another example, the object filtering engine 708, in conjunction with the user filtering engine 706, enables users having a user access level identifier higher than (or equal to) a predetermined threshold (level 3) to view objects having an object access level identifier higher than (or equal to) a predetermined threshold (level 5), and disables users having a user access level identifier lower than a predetermined threshold (level 2) to view objects having an object access level identifier lower than a predetermined threshold (level 5). In a more specific example, the object filtering engine 708 enables observation of objects (e.g., objects inadmissible as evidence) by users (e.g., judges and attorneys) and disables observation of the objects by other users (e.g., jury).

In the example of FIG. 7, the media filtering engine 710 is intended to specifically-purposed hardware and software that filters media files to be accessible by users in a VR scene from the VR scene, in a similar manner as filtering of objects by the object filtering engine 708. That is, the media filtering engine 710 assigns a media file identifier and a unique media access level identifier to each media file in a VR scene, and restricts access to a media file based on a media file identifier and/or media access level identifier of the media file. In addition, the media filtering engine 710 operates, in conjunction with the user filtering engine 706 to allow access to a media file to limited users, and/or operates, further in conjunction with the object filtering engine 708, to allow access to a media file to limited users having access to a particular object or objects of particular access level(s).

Figure 8:
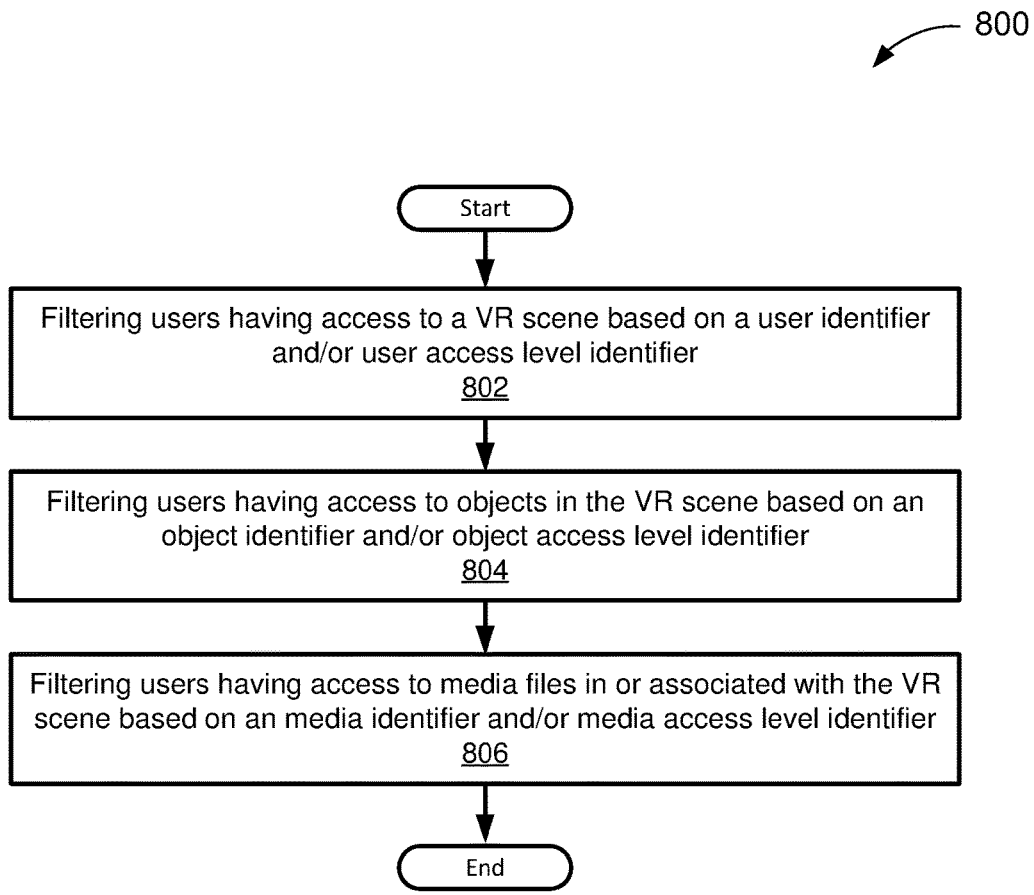
FIG. 8 depicts a flowchart of an example of a method for carrying out filtering of a VR scene.

FIG. 8 depicts a flowchart 800 of an example of a method for carrying out filtering of a VR scene. The flowchart 800 starts at module 802 with filtering users who are authorized to access a VR scene based on a user identifier and/or user access level identifier.

In the example of FIG. 8, the flowchart 800 continues to module 804 with filtering objects in the VR scene viewable by users in a VR scene based on an object identifier and/or object access level identifier. In a specific implementation, the filtering of the objects in a VR scene is carried out with respect to all users in the VR scene, or with respect to part of the users based on the user identifiers and/or user access level identifiers.

In the example of FIG. 8, the flowchart 800 ends at module 806 with filtering media files in or associated with the VR scene viewable by users in a VR scene based on a media identifier and/or media access level identifier. In a specific implementation, the filtering of the media files in a VR scene is carried out with respect to all users in the VR scene, or with respect to part of the users based on the user identifiers and/or user access level identifiers. In a specific implementation, the filtering of the media files in a VR scene is carried out with respect to whether or not users have access to objects in the VR scene, e.g., access to a particular object having an object identifier and/or access to object having a particular object access level identifier(s).

These and other examples provided in this paper are intended to illustrate but not necessarily to limit the described implementation. As used herein, the term "implementation" means an implementation that serves to illustrate by way of example but not limitation. The techniques described in the preceding text and figures can be mixed and matched as circumstances demand to produce alternative implementations.

I claim:

1. A method comprising:
obtaining real world image data using one or more image data capturing devices positioned at a real world site, the one or more image data capturing devices being distinct from one or more VR playback devices;
obtaining real world non-image data using one or more sensors positioned at the real world site, the one or more sensors being distinct from the one or more VR playback devices;
creating a scene model based on the obtained real world image data;
integrating the obtained real world non-image data with the created scene model to create an integrated scene model;
automatically carrying out an object recognition process to identify one or more objects included in the integrated scene model, each of the one or more objects corresponding to a respective portion of the obtained real world image data, at least one of the one or more objects comprising an incomplete object;
completing the incomplete object of the integrated scene model based on the object recognition process to create a completed integrated scene model;
rendering the completed integrated scene model to create a VR scene in which one or more users are immersed using the one or more VR playback devices.

2. The method of claim 1, wherein the non-image data include audio data, and integrating the obtained real world non-image data comprises a representation of the audio data in the scene model, activation of the representation in the VR scene through one of the VR playback devices causing playing of the audio data on the one of the VR playback devices.

3. The method of claim 1, wherein the non-image data include non-audio data, and integrating the obtained real world non-image data comprises placing a representation of the non-audio data in the scene model, activation of the representation in the VR scene through one of the VR playback devices causing displaying of information corresponding to the non-audio data on the one of the VR playback devices.

4. The method of claim 1, further comprising:
when a plurality of users is immersed in the VR scene, detecting a communication input by one of the plurality of users through one of the VR playback devices;
generating a communication output to another one of the VR playback devices based on the communication input.

5. The method of claim 4, wherein the communication input is at least one of a text input, a voice input, a gesture input, and the communication output is of a different format from a format of the communication input.

6. The method of claim 1, further comprising:
when a plurality of users is immersed in the VR scene, reflecting a field of view (FOV) of the VR scene presented to one of the plurality of users to a FOV of the VR scene presented to another one of the plurality of users.

7. The method of claim 1, further comprising:
when a plurality of users is immersed in the VR scene, during a first operational mode, presenting a representation of each of the plurality of users in the VR scene, so as to be mutually viewable in the VR scene;
during a second operational mode, hiding a representation of at least one of the plurality of users in the VR scene, so as to be not viewable in the VR scene.

8. The method of claim 1, further comprising:
detecting a user input to add a synthetic virtual object on one of the VR playback devices;
presenting the synthetic virtual object in the VR scene.

9. The method of claim 1, further comprising:
detecting a user input to add an annotation on one of the VR playback devices;
presenting a representation of the annotation in the VR scene, activation of the representation of the annotation in the VR scene causing displaying or playing of the annotation.

10. The method of claim 1, further comprising:
tracking activity of at least one of the users in the VR scene;
generating a report regarding the activity of the at least one of the users based the tracked activity.

11. A system comprising:
at least one processor and memory configured to store instructions to instruct the at least one processor to:
obtain real world image data using one or more image data capturing devices positioned at a real world site, the one or more image data capturing devices being distinct from one or more VR playback devices;
obtain real world non-image data using one or more sensors positioned at the real world site the one or more sensors being distinct from the one or more VR playback devices;
create a scene model based on the obtained real world image data;
integrate the obtained real world non-image data with the created scene model to create an integrated scene model;
automatically carry out an object recognition process to identify one or more objects included in the integrated scene model, each of the one or more objects corresponding to a respective portion of the obtained real world image data, at least one of the one or more objects comprising an incomplete object;
complete the incomplete object of the integrated scene model based on the object recognition process to create a completed integrated scene model;

render the completed integrated scene model to create a VR scene in which one or more users are immersed using the one or more VR playback devices.

12. The system of claim 11, wherein the non-image data include audio data, and the instructions are further configured to instruct the at least one processor to place a representation of the audio data in the scene model, activation of the representation in the VR scene through one of the VR playback devices causing playing of the audio data on the one of the VR playback devices.

13. The system of claim 11, wherein the non-image data include non-audio data, and the instructions are further configured to instruct the at least one processor to place a representation of the non-audio data in the scene model, activation of the representation in the VR scene through one of the VR playback devices causing displaying of information corresponding to the non-audio data on the one of the VR playback devices.

14. The system of claim 11, wherein when a plurality of users is immersed in the VR scene, the instructions are further configured to instruct the at least one processor to detect a communication input by one of the plurality of users through one of the VR playback devices, and generate a communication output to another one of the VR playback devices based on the communication input.

15. The system of claim 14, wherein the communication input is at least one of a text input, a voice input, a gesture input, and the communication output is of a different format from a format of the communication input.

16. The system of claim 11, wherein when a plurality of users is immersed in the VR scene, the instructions are further configured to instruct the at least one processor to reflect a field of view (FOV) of the VR scene presented to one of the plurality of users to a FOV of the VR scene presented to another one of the plurality of users.

17. The system of claim 11, wherein when a plurality of users is immersed in the VR scene, the instructions are further configured to instruct the at least one processor to:
present a representation of each of the plurality of users in the VR scene, so as to be mutually viewable in the VR scene, in a first operational mode;
hide a representation of at least one of the plurality of users in the VR scene, so as to be not viewable in the VR scene, in a second operational mode.

18. The system of claim 11, wherein the instructions are further configured to instruct the at least one processor to:
detect a user input to add a synthetic virtual object on one of the VR playback devices;
present the synthetic virtual object in the VR scene.

19. The system of claim 11, wherein the instructions are further configured to instruct the at least one processor to:
detect a user input to add an annotation on one of the VR playback devices;
present a representation of the annotation in the VR scene, activation of the representation of the annotation in the VR scene causing displaying or playing of the annotation.

20. The system of claim 11, wherein the instructions are further configured to instruct the at least one processor to:
track activity of at least one of the users in the VR scene;
generate a report regarding the activity of the at least one of the users based the tracked activity.

* * * * *